US011742753B2

(12) United States Patent
Choi et al.

(10) Patent No.: US 11,742,753 B2
(45) Date of Patent: Aug. 29, 2023

(54) ELECTRONIC DEVICE HAVING VOLTAGE DIVIDER ADAPTIVELY CHANGING VOLTAGE DIVISION RATIO

(71) Applicant: Samsung Electronics Co., Ltd., Gyeonggi-do (KR)

(72) Inventors: Hangseok Choi, Gyeonggi-do (KR); Sangwoo Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 16/885,535

(22) Filed: May 28, 2020

(65) Prior Publication Data
US 2020/0381994 A1 Dec. 3, 2020

(30) Foreign Application Priority Data
May 28, 2019 (KR) .......................... 10-2019-0062315

(51) Int. Cl.
*H02M 3/06* (2006.01)
*H02J 7/00* (2006.01)
(Continued)

(52) U.S. Cl.
CPC ......... *H02M 3/06* (2013.01); *H01M 10/4264* (2013.01); *H01M 10/44* (2013.01);
(Continued)

(58) Field of Classification Search
CPC .. H02J 7/007; H02J 7/00712; H02J 7/007182; H02J 7/0045; H02J 7/345;
(Continued)

(56) References Cited

U.S. PATENT DOCUMENTS 7,764,050 B2 * 7/2010 Xing ....................... H02J 7/022
320/137
10,033,277 B2 7/2018 Ripley et al.
(Continued)

FOREIGN PATENT DOCUMENTS

KR   10-2008-0028170 A   3/2008
KR   10-2016-0107785 A   9/2016
WO      2017/156532 A1   9/2017

OTHER PUBLICATIONS

International Search Report dated Sep. 21, 2020.
European Search Report dated Mar. 23, 2022.
European Office Action dated Dec. 9, 2022.

*Primary Examiner* — Edward Tso
*Assistant Examiner* — Aaron Piggush
(74) *Attorney, Agent, or Firm* — Cha & Reiter, LLC

(57) ABSTRACT

An electronic device including a voltage divider adaptively changing a voltage division ratio is provided. The electronic device comprises a rechargeable battery; a connector configured to connected the electronic device with an external electronic device; a voltage divider comprising a plurality of capacitors and a plurality of switches for switching an electrical path between each of the plurality of capacitors and the rechargeable battery, wherein the voltage divider is configured to provide three or more voltage division ratios; and a processor operably coupled with the voltage divider and the connector, wherein the processor is configured to: receive an indicator indicating a first voltage of a first power from the external electronic device; select a voltage division ratio from the three or more division ratios, based at least in part on the indicator; and control the plurality of switches on the basis of the selected voltage division ratio, and wherein the voltage divider is configured to: charge a rechargeable battery with a second voltage by dividing the first voltage according to the selected voltage division ratio.

19 Claims, 23 Drawing Sheets

(51) Int. Cl.
  *H02M 3/158* (2006.01)
  *H01M 10/44* (2006.01)
  *H01M 10/42* (2006.01)
  *G05F 1/59* (2006.01)
  *H02J 7/34* (2006.01)

(52) U.S. Cl.
  CPC ........ *H02J 7/0045* (2013.01); *H02J 7/00712* (2020.01); *H02J 7/007182* (2020.01); *H02M 3/158* (2013.01); *G05F 1/59* (2013.01); *H02J 7/007* (2013.01); *H02J 7/345* (2013.01); *H02J 2207/20* (2020.01)

(58) Field of Classification Search
  CPC ...... H02J 2207/20; H02M 3/06; H02M 3/158; H01M 10/44; H01M 10/4264; G05F 1/59
  USPC .................. 320/137, 155, 158, 163, 166
  See application file for complete search history.

(56) References Cited

U.S. PATENT DOCUMENTS

| | | | |
|---|---|---|---|
| 2009/0033289 A1* | 2/2009 | Xing | H02J 7/007182 320/140 |
| 2011/0121661 A1 | 5/2011 | Kawakami et al. | |
| 2014/0375280 A1* | 12/2014 | Jung | H02J 7/0029 320/163 |
| 2016/0118905 A1* | 4/2016 | Freeman | H02M 3/33515 363/21.1 |
| 2017/0133842 A1 | 5/2017 | Freeman et al. | |
| 2019/0044436 A1* | 2/2019 | Hijazi | H02J 7/063 |
| 2019/0089170 A1 | 3/2019 | Liu et al. | |
| 2019/0372387 A1* | 12/2019 | Wan | H02J 50/80 |
| 2020/0136421 A1 | 4/2020 | Kim et al. | |

* cited by examiner

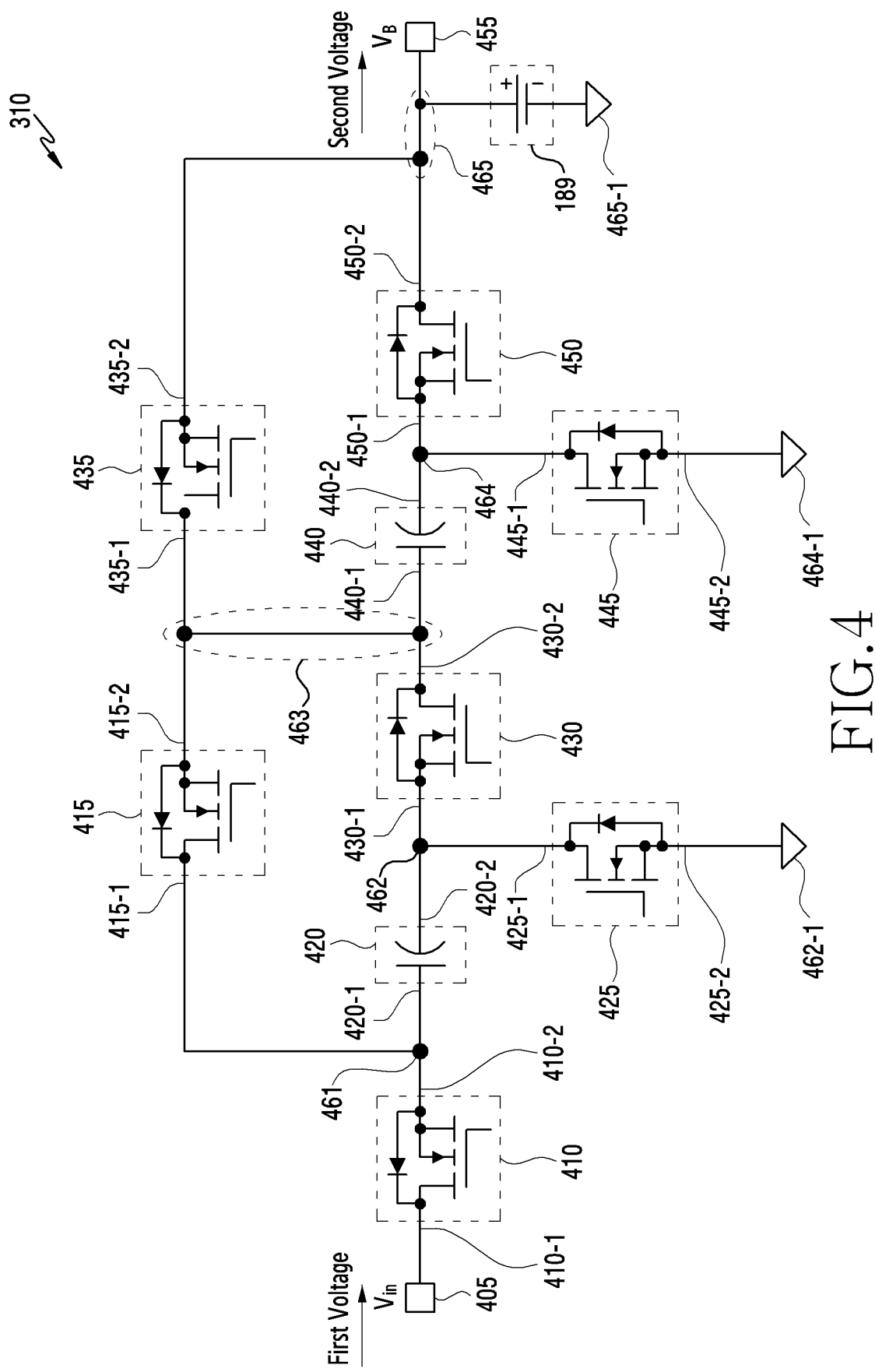

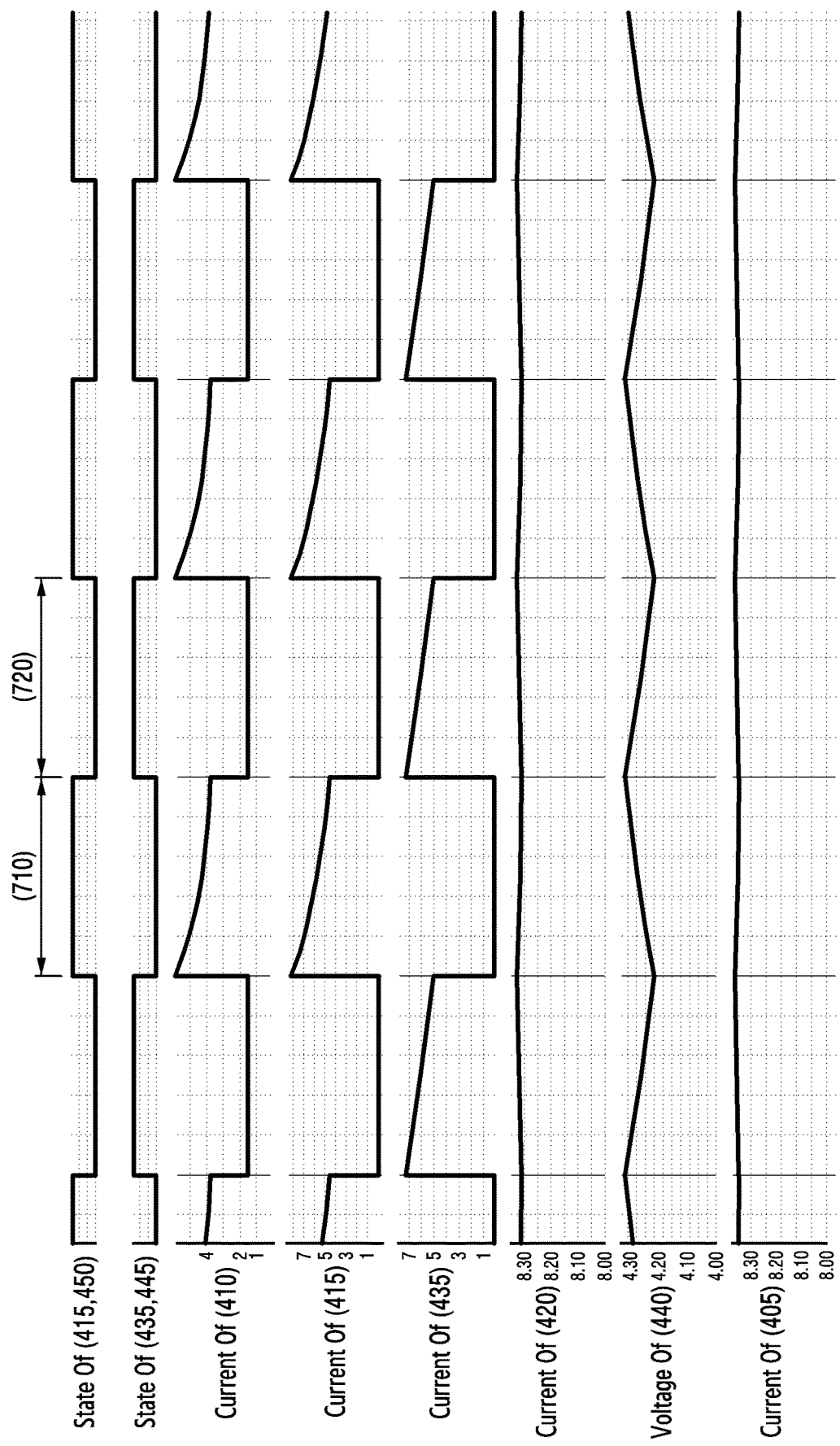

ELECTRONIC DEVICE HAVING VOLTAGE DIVIDER ADAPTIVELY CHANGING VOLTAGE DIVISION RATIO

CROSS-REFERENCE TO RELATED APPLICATION(S)

This application is based on and claims priority under 35 U.S.C. § 119 to Korean Patent Application No. 10-2019-0062315, filed on "May 28, 2019", in the Korean Intellectual Property Office, the disclosure of which is incorporated by reference herein in its entirety.

BACKGROUND

Field

Certain embodiments described later generally relate to direct charging of a battery. More particularly, certain embodiments described later relate to an electronic device including a voltage divider adaptively changing a voltage division ratio.

Description of Related Art

An electronic device such as a smart phone, a smart watch, or a tablet personal computer (PC) can include a rechargeable battery for the sake of portability. However, the rechargeable battery discharges while the device is ported. As a result, the rechargeable battery may have to be recharged frequently, such as on a daily basis. During the time that the rechargeable battery is being charged, the device may not be portable. Accordingly, it is beneficial to reduce the time required to charge a battery.

The above information is presented as background information only to assist with an understanding of the present disclosure. No determination has been made, and no assertion is made, as to whether any of the above might be applicable as prior art with regard to the present disclosure.

SUMMARY

According to certain embodiments, an electronic device comprises a rechargeable battery; a connector configured to connected the electronic device with an external electronic device; a voltage divider comprising a plurality of capacitors and a plurality of switches for switching an electrical path between each of the plurality of capacitors and the rechargeable battery, wherein the voltage divider is configured to provide three or more voltage division ratios; and a processor operably coupled with the voltage divider and the connector, wherein the processor is configured to: receive an indicator indicating a first voltage of a first power from the external electronic device; select a voltage division ratio from the three or more division ratios, based at least in part on the indicator; and control the plurality of switches on the basis of the selected voltage division ratio, and wherein the voltage divider is configured to: charge the rechargeable battery with a second voltage by dividing the first voltage according to the selected voltage division ratio.

An effect obtainable from certain embodiments of the present disclosure is not limited to the above-mentioned effects, and other effects not mentioned will be able to be apparently understood from the following statement by a person having ordinary skill in the art to which the present disclosure pertains.

BRIEF DESCRIPTION OF THE DRAWINGS

FIG. 4 illustrates an example of a voltage divider according to an embodiment.

FIG. 7C is a timing diagram of the voltage divider shown in FIG. 7A to FIG. 7B.

DETAILED DESCRIPTION

A charging scheme of performing control of a constant voltage and a constant current of the rechargeable battery in a charging device (e.g., a travel adapter (TA) or power adapter (PA)) is can be used for high-speed charging of the rechargeable battery of a portable electronic device. On the other hand, an output voltage (or output current) of the charging device can be different according to the setting of the charging device. Accordingly, a voltage divider for direct charging adaptively changing a voltage division ratio is desirable in the portable electronic device.

Technological solutions the present document seeks to achieve are not limited to the above-mentioned technological solutions, and other technological solutions not mentioned above would be able to be clearly understood by a person having ordinary skill in the art from the following statement.

Figure 1:
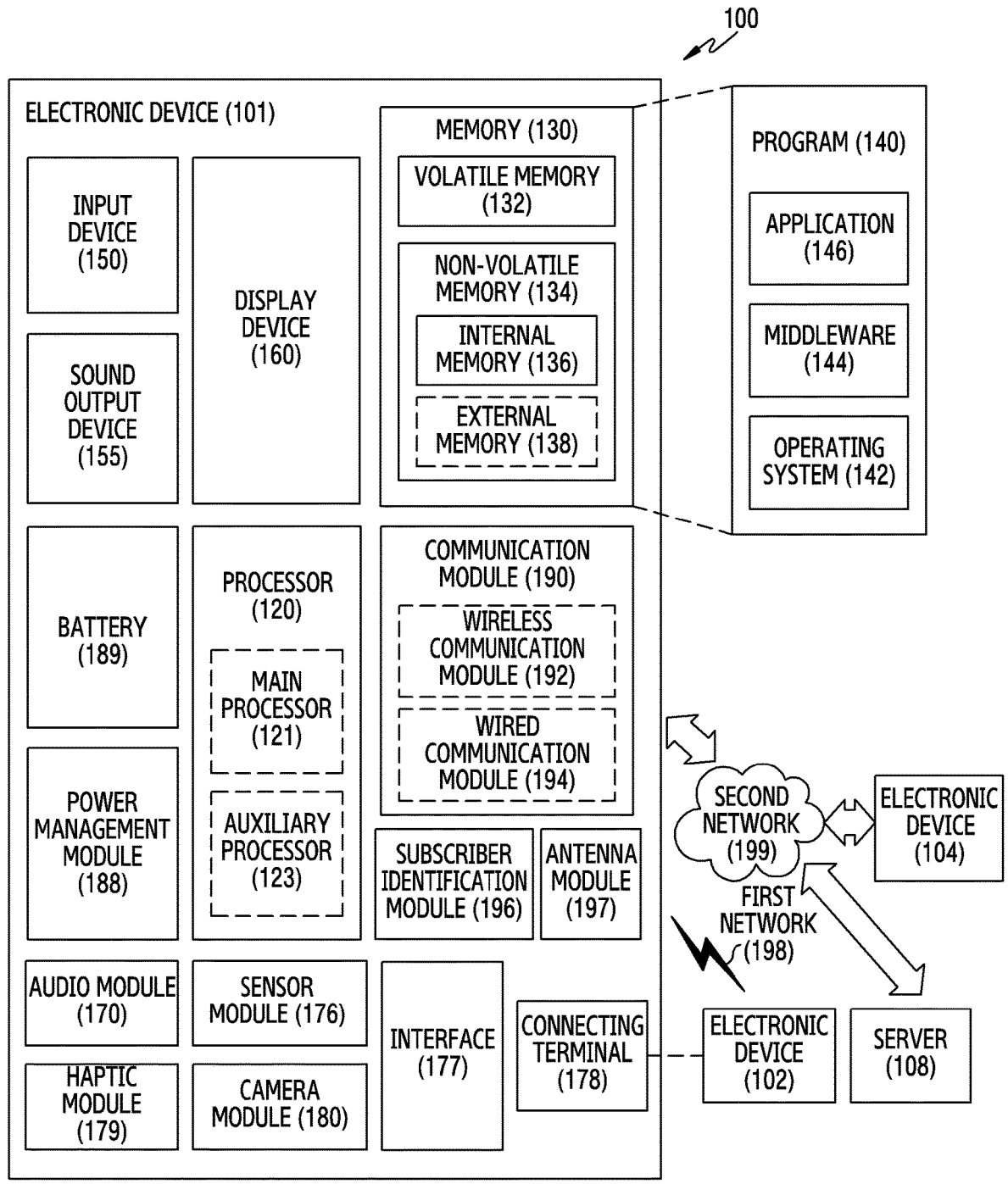
FIG. 1 is a block diagram of an electronic device within a network environment according to certain embodiments.

FIG. 1 describes an electronic device where certain embodiments of the present disclosure can be practiced. Specifically, the electronic device 101 can include a battery 189 to allow portability.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural context.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
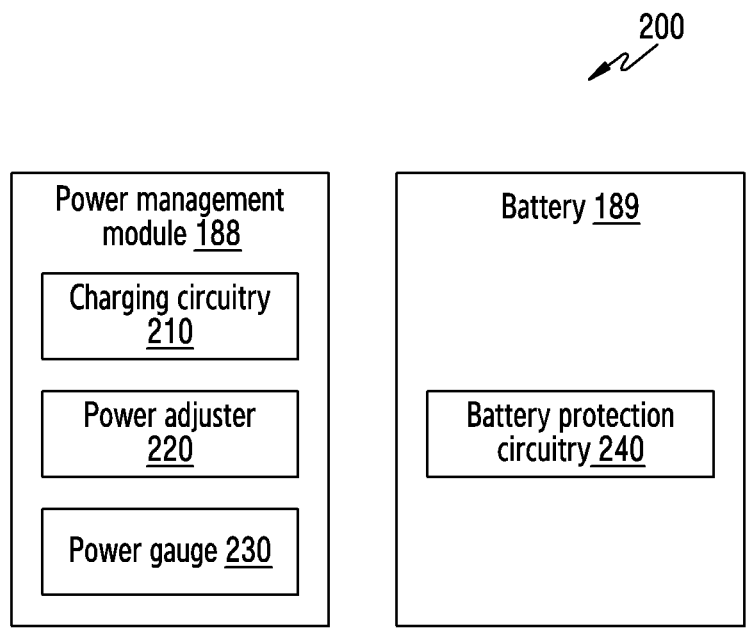
FIG. 2 is a block diagram of a power management module and a battery according to certain embodiments.

FIG. 2 is a block diagram 200 illustrating the power management module 188 and the battery 189 according to certain embodiments. Referring to FIG. 2, the power management module 188 may include charging circuitry 210, a power adjuster 220, or a power gauge 230.

In certain embodiments, the charging circuitry 210 can select the charging scheme for charging the battery 189. The power adjuster 220 can generate a power level, voltage level, and current level for application to the battery 189 based on scheme for charging the battery 189 that is selected by the charging circuitry 210. The power gauge 230 can determine the state of the battery 189, including, among other things, determine the charged level.

The charging circuitry 210 may select a charging scheme for charging the battery 189. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of different power levels having different voltage levels or different current levels. The different power levels can be generated by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator.

The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
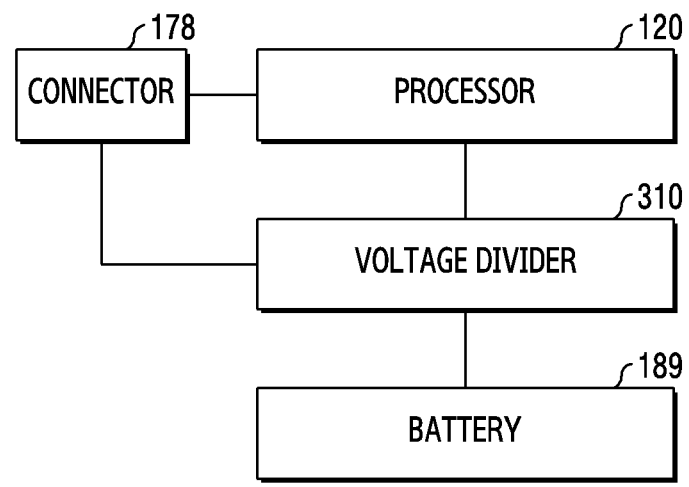
FIG. 3A is a simplified block diagram of an electronic device according to one or more embodiments.

FIG. 3A is a block diagram of an electronic device according to one or more embodiments.

Referring to FIG. 3A, the electronic device 101 may include a processor 120 (e.g., the processor 120 of FIG. 1), a connector 178 (e.g., the connection terminal 178 of FIG. 1), a battery 189 (e.g., the battery 189 of FIG. 1), and a voltage divider 310.

The processor 120 receives a signal, via the connector 178. The signal can indicate a voltage or power level of power received from the external electronic device. Based on the signal, the processor 120 selects a particular one of three or more division ratios that the voltage divider 310 is capable of realizing. The processor 120 then controls capacitors and switches of the voltage divider 310 to realize the selected division ratio. The voltage divider 310 then divides the voltage received from connector 178 for application to the battery 189.

In one or more embodiments, the connector 178 may be configured to be connected to an external electronic device (e.g., a power adapter (PA)) or travel adapter (TA)), thereby providing power for charging of the battery of the electronic device 101. Direct charging may include a charging scheme of providing a constant voltage and constant current of the rechargeable battery in the charging device, to minimize the heat generation. In one or more embodiments, the connector 178 may establish a path for a signal from the external electronic device to the electronic device 101 or vice versa.

In the following descriptions, an example of wired connection power from the external electronic device via the connector 178 is described, although it should be understood that the disclosure is not limited to the foregoing. Moreover, the external electronic device of one or more embodiments may include a wireless power transmitting device such as a wireless charging pad as well.

In one or more embodiments, the processor 120 may be a main processor (e.g., the main processor 121 of FIG. 1) of the electronic device 101 or may be an auxiliary processor. The processor 120 may be an auxiliary processor included in the voltage divider 310 or disposed outside the voltage divider 310 and operably coupled with the voltage divider 310.

In one or more embodiments, the voltage divider 310 may include a plurality of capacitors, and a plurality of switches. The plurality of capacitors and switches can switch an electrical path between each of the plurality of capacitors and the battery 189. As a result, the voltage divider 310 can provide three or more voltage division ratios. Each one of the plurality of capacitors may be referred to as a flying capacitor. In one or more embodiments, each of the plurality of capacitors may be included in the voltage divider 310 for voltage division. The plurality of capacitors may include a first capacitor and a second capacitor. In one or more embodiments, each of the plurality of switches may be included in the voltage divider 310, in order to provide a voltage division ratio corresponding to a voltage presented from the external electronic device. In one or more embodiments, each of the plurality of switches may include a metal oxide semiconductor field effect transistor (MOSFET). In one or more embodiments, each of the plurality of switches can have a first state of connecting the electrical path (or a short/short circuit) or a second state of disconnecting the electrical path (open circuit/high impedance), according to the control of the processor 120. However, the disclosure is not limited to the foregoing. In one or more embodiments, the processor 120 may acquire data for representing (receive an indicator for indicating) a first voltage from the external electronic device. The first voltage is the voltage that the external electronic device applies to the electronic device 101 (via connector 178) to charge the battery 189. For example, when the connector 178 is a USB c type, the indicator from the external electronic device may indicate the power delivery (PD) communication protocol of the USB standard.

The processor 120 may identify or determine how to process the first voltage received from the external electronic using the voltage divider 310, on the basis of the acquired data. For example, when receiving an indicator indicating that direct charging is suitable, the processor 120 may cause the voltage divider 310 to output the first voltage. For another example, in response to receiving an indicator indicating that direct charging is not suitable, the processor 120 may present the power for applying the first voltage received from the external electronic device, to another power management circuitry included in the electronic device 101, by using a charging path switching circuitry (not shown in FIG. 3A) (e.g., a switching charger 330 of FIG. 3B).

In one or more embodiments, in response to receiving an indicator indicating that direct charging is suitable, the processor 120 may control a state of the plurality of switches included in the voltage divider 310, causing the voltage divider to execute voltage division according to a voltage division ratio corresponding to the data among the three or more voltage division ratios supportable using the voltage divider 310.

In one or more embodiments, the voltage divider 310 may perform voltage division for the first voltage according to the voltage division ratio corresponding to the data among the three or more voltage division ratios, on the basis of the control of the state of the plurality of switches of the processor 120, and present power for applying a second voltage corresponding to a charging voltage of the battery 189 to the battery 189 on the basis of the performed voltage division, to the battery 189.

For example, in response to the first voltage being a triple of the charging voltage of the battery 189, the first capacitor and the second capacitor within the voltage divider 310 may be connected in series to each of an input terminal of the voltage divider 310 which is electrically connected with the external electronic device and an output terminal of the voltage divider 310 which is electrically connected with the battery 189 for the sake of the direct charging, on the basis of the control of the plurality of switches of the processor

120. By the series connection, each of the first capacitor and the second capacitor may be charged on the basis of the charging voltage and the first voltage. For example, each of the first capacitor and the second capacitor may be charged to get the charging voltage. After each of the first capacitor and the second capacitor gets the charging voltage, the first capacitor and the second capacitor may be electrically disconnected with the input terminal and be connected in parallel with respect to the battery 189 electrically connected with the output terminal, on the basis of the control of the plurality of switches of the processor 120. The first capacitor and the second capacitor get the charging voltage, so the battery 189 may acquire the second voltage corresponding to the charging voltage through the discharging of the first capacitor and the second capacitor which are connected in parallel with respect to the battery 189. By performing 3-to-1 voltage division through the charging and discharging of the first capacitor and the second capacitor, the voltage divider 310 of an embodiment may present the second voltage corresponding to the charging voltage to the battery 189. On the other hand, while presenting the second voltage to the battery 189, the voltage divider 310 may present a current corresponding to a triple of a current applied from the external electronic device, to the battery 189, through the charging and discharging of the first capacitor and the second capacitor.

For example, in response to the first voltage being a double of the charging voltage of the battery 189, one capacitor among the first capacitor and the second capacitor within the voltage divider 310 may be connected in series to each of the input terminal of the voltage divider 310 electrically connected with the external electronic device and the output terminal of the voltage divider 310 electrically connected with the battery 189 for the sake of the direct charging, on the basis of the control of the plurality of switches of the processor 120. By the series connection, the one capacitor among the first capacitor and the second capacitor may be charged on the basis of the charging voltage and the first voltage. For example, the one capacitor among the first capacitor and the second capacitor may be charged to get the charging voltage. After the one capacitor among the first capacitor and the second capacitor gets the charging voltage, the one capacitor among the first capacitor and the second capacitor may be electrically disconnected with the input terminal and be connected in parallel with respect to the battery 189 electrically connected with the output terminal, on the basis of the control of the plurality of switches of the processor 120. The one capacitor among the first capacitor and the second capacitor gets the charging voltage, so the battery 189 may acquire the second voltage corresponding to the charging voltage through the discharging of the one capacitor among the first capacitor and the second capacitor which are connected in parallel with respect to the battery 189. By performing 2-to-1 voltage division through the charging and discharging of the one capacitor among the first capacitor and the second capacitor, the voltage divider 310 of an embodiment may present the second voltage corresponding to the charging voltage to the battery 189. On the other hand, while presenting the second voltage to the battery 189, the voltage divider 310 may present a current corresponding to a double of a current applied from the external electronic device, to the battery 189, through the charging and discharging of the one capacitor among the first capacitor and the second capacitor.

For example, in response to the first voltage corresponding to the charging voltage of the battery 189 (i.e., in response to the first voltage being the same as the charging voltage of the battery 189), the input terminal may be directly connected to the output terminal of the voltage divider 310 electrically connected with the battery 189, on the basis of the control of the plurality of switches of the processor 120. For example, when the first voltage substantially corresponds (or is within 10% of) to the charging voltage of the battery 189, the processor 120 may control a state of the plurality of switches to form a short circuit from the external electronic device to the output terminal, thereby by passing the first capacitor and the second capacitor. By performing 1-to-1 voltage division on the basis of direct connection between the input terminal and the output terminal, the voltage divider 310 of an embodiment may present the second voltage corresponding to the charging voltage to the battery 189. On the other hand, while presenting the second voltage to the battery 189, the voltage divider 310 may present a current corresponding to one time as much as a current applied from the external electronic device, to the battery 189, on the basis of the direct connection between the input terminal and the output terminal.

Figure 3B:
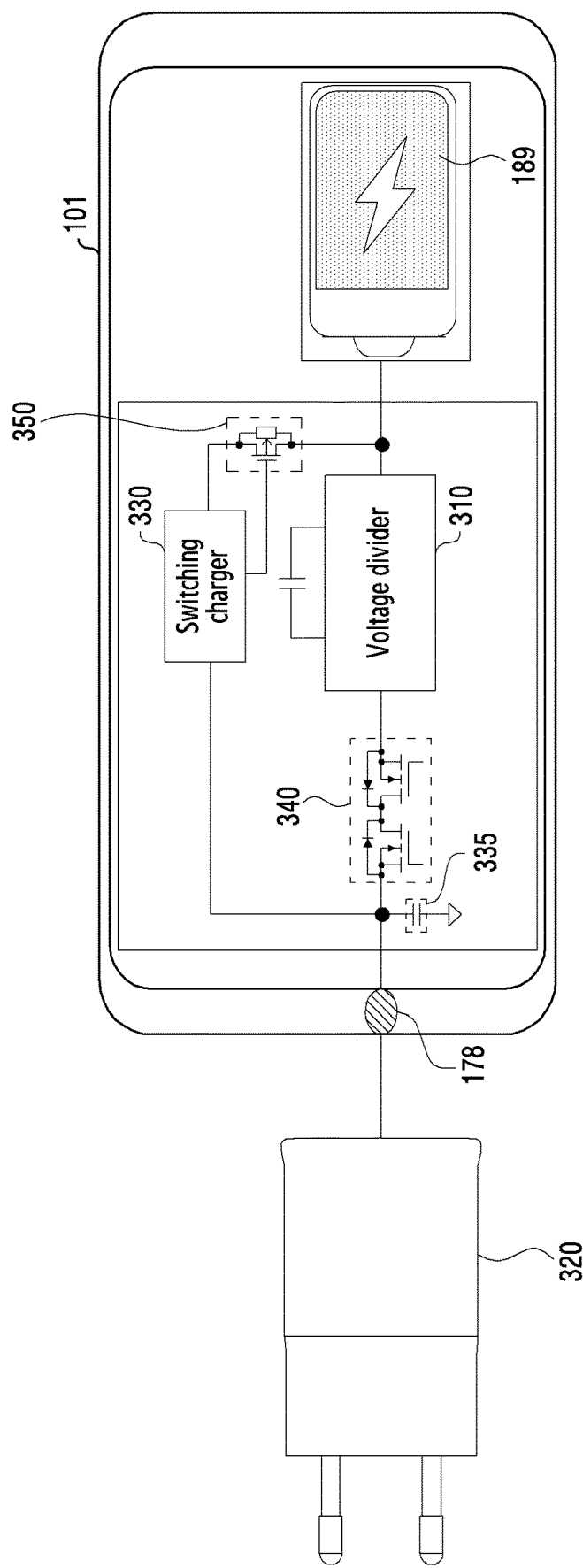
FIG. 3B is a simplified block diagram of an electronic device and an external electronic device according to one or more embodiments.

FIG. 3B is a block diagram of an electronic device and an external electronic device according to one or more embodiments.

For example, referring to FIG. 3B, the external electronic device 320 including a Power Adapter (PA) or Travel Adapter (TA) may be connected to the voltage divider 310 or the switching charger 330 via the connector 178. When the external electronic device 320 provides a first voltage for possible voltage division through the voltage divider 310. The first voltage may pass through an over-voltage protection circuitry 340 for protection of the voltage divider 310, in one or more embodiments. The first voltage may pass through the over-voltage protection circuitry 340 further connected with an input capacitor 335, and be applied to the voltage divider 310. By performing the voltage division for the first voltage, the voltage divider 310 may charge the battery 189.

In response to the first voltage being a voltage that cannot be divided by the voltage divider 310, the switching charger 330 may acquire the first voltage from the external electronic device 320 and charge the battery 189. In response to the battery 189 being fully charged, a switch 350 may be used to disconnect or open the electrical connection between the switching charger 330 and the battery.

As mentioned above, the voltage divider 310 included in the electronic device 101 of one or more embodiments may perform direct charging of the battery 189, by changing a connection structure of the voltage divider 310 to support a voltage division ratio corresponding to a magnitude of the voltage presented from the external electronic device among three or more voltage division ratios. Through this execution of the direct charging, the electronic device 101 of one or more embodiments may maintain compatibility while improving high-speed charging performance.

FIG. 4 illustrates an example of a voltage divider according to an embodiment.

For example, referring to FIG. 4, the voltage divider 310 may include an input terminal 405, a first switch 410, a second switch 415, a first capacitor 420, a third switch 425, a fourth switch 430, a fifth switch 435, a second capacitor 440, a sixth switch 445, a seventh switch 450, and an output terminal 455. In one or more embodiments, the control of the first switch 410 to the seventh switch 450 may be performed by the processor 120.

The input terminal 405 may be electrically connected with the external electronic device via the connector 178. The first switch 410 may include terminal 410-1 and terminal 410-2. The second switch 415 may include a terminal 415-1 and a terminal 415-2. The first capacitor 420 may include terminal 420-1 and terminal 420-2. The third switch 425 may include terminal 425-1, and terminal 425-2 electrically connected with the ground. The fourth switch 430 may include a terminal 430-1 and terminal 430-2. The fifth switch 435 may include terminal 435-1 and terminal 435-2. The second capacitor 440 may include terminal 440-1 and terminal 440-2. The sixth switch 445 may include terminal 445-1, and terminal 445-2 electrically connected with the ground. The seventh switch 450 may include terminal 450-1 and terminal 450-2. The output terminal 455 may be electrically connected with the battery 189. The switches 410, 415, 420, . . . 450 may establish either short circuit/electrical connection or open circuit/disconnect between the respective terminals.

In one or more embodiments, the first switch 410 may be disposed between the input terminal 405 and a first node 461. The first capacitor 420 may be disposed between the first node 461 and a second node 462. The second switch 415 may be disposed between the first node 461 and a third node 463. The third switch 425 may be disposed between the second node 462 and a first ground node 462-1. The fourth switch 430 may be disposed between the second node 462 and the third node 463. The fifth switch 435 may be disposed between the third node 463 and a fifth node 465. The second capacitor 440 may be disposed between the third node 463 and a fourth node 464. The sixth switch 445 may be disposed between the fourth node 464 and a second ground node 464-1. The seventh switch 450 may be disposed between the fourth node 464 and the fifth node 465. The output terminal 465 may correspond to the fifth node 465. The battery 189 may be disposed between the fifth node 465 and a third ground node 465-1.

According to an embodiment, the first ground node 462-1, the second ground node 464-1 and/or the third ground node 465-1 may be electrically connected.

Although not illustrated in FIG. 4, in an embodiment, the input terminal may be further connected with a third capacitor that is an input capacitor.

FIG. 4 to FIG. 8 illustrate an example in which the voltage divider 310 includes two capacitors (e.g., the first capacitor 420 and the second capacitor 440) and seven switches (e.g., the first switch 410 to the seventh switch 450) in order to support three voltage division ratios, but the voltage divider 310 of certain embodiments may include three or more capacitors and eight or more switches, thereby supporting four or more voltage division ratios as well. In one or more embodiments, the respective capacitors may be comprised of a plurality of parallel capacitors in order to support voltage division.

In one or more embodiments, in response to the first voltage being substantially triple the charging voltage of the battery 189, the voltage divider 310 may support a 3-to-1 voltage division ratio on the basis of the control of the first switch 410 to seventh switch 450 of the processor 120.

Figure 5A:
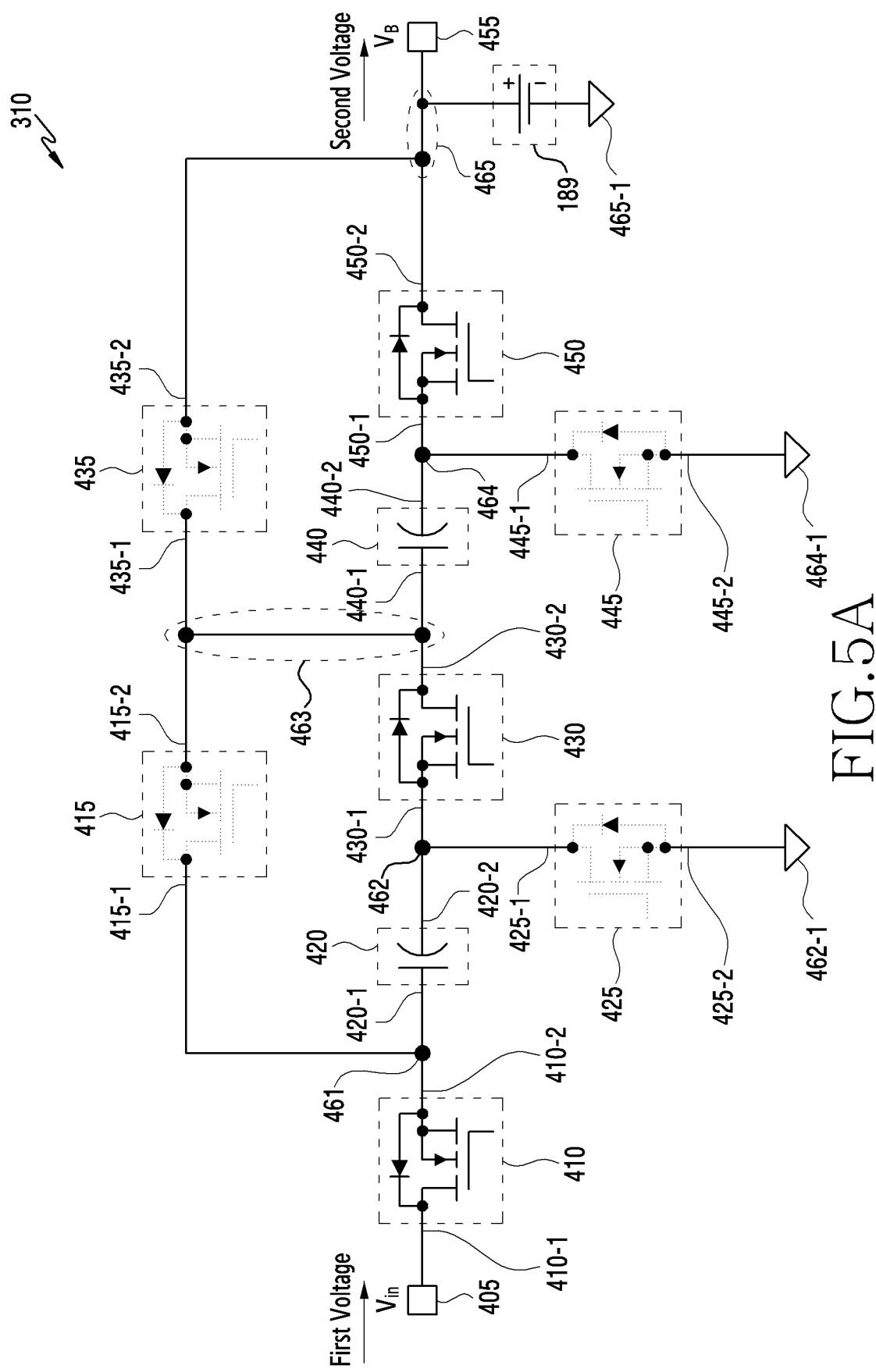
FIG. 5A to FIG. 5B illustrate an example of a connection structure of a voltage divider performing 3-to-1 voltage division according to an embodiment.
Figure 5B:
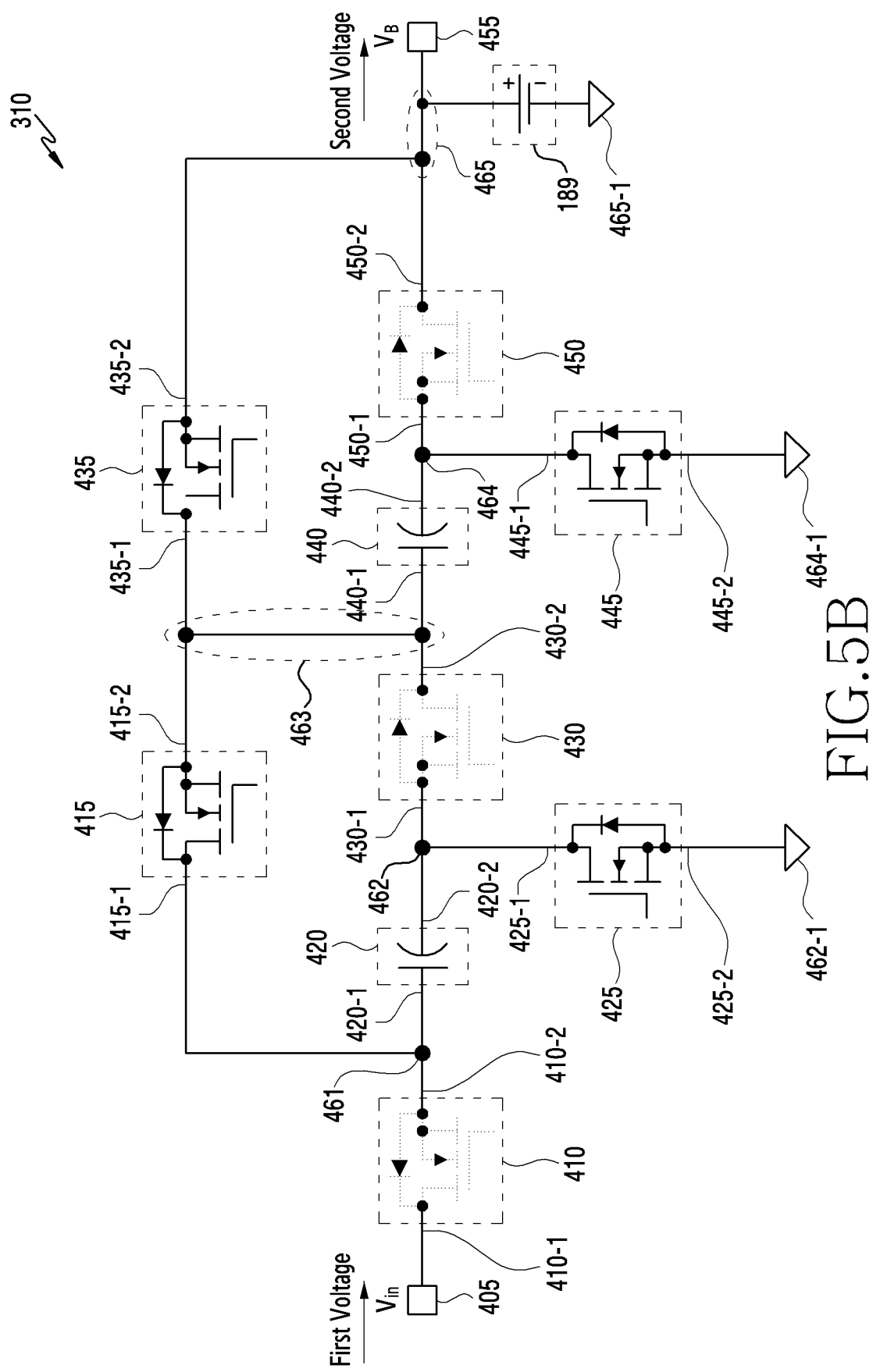

FIG. 5A to FIG. 5B illustrate an example of a connection structure of a voltage divider performing 3-to-1 voltage division according to an embodiment. In FIG. 5A, the switches 410, 430, and 450 are shorted, thereby causing capacitors 420 and 440 to charge. In FIG. 5B, switches 410, 430, and 450 are open circuit, and switches 415 and 435 are shorted, causing the capacitors 420 and 440 to discharge.

Figure 5C:
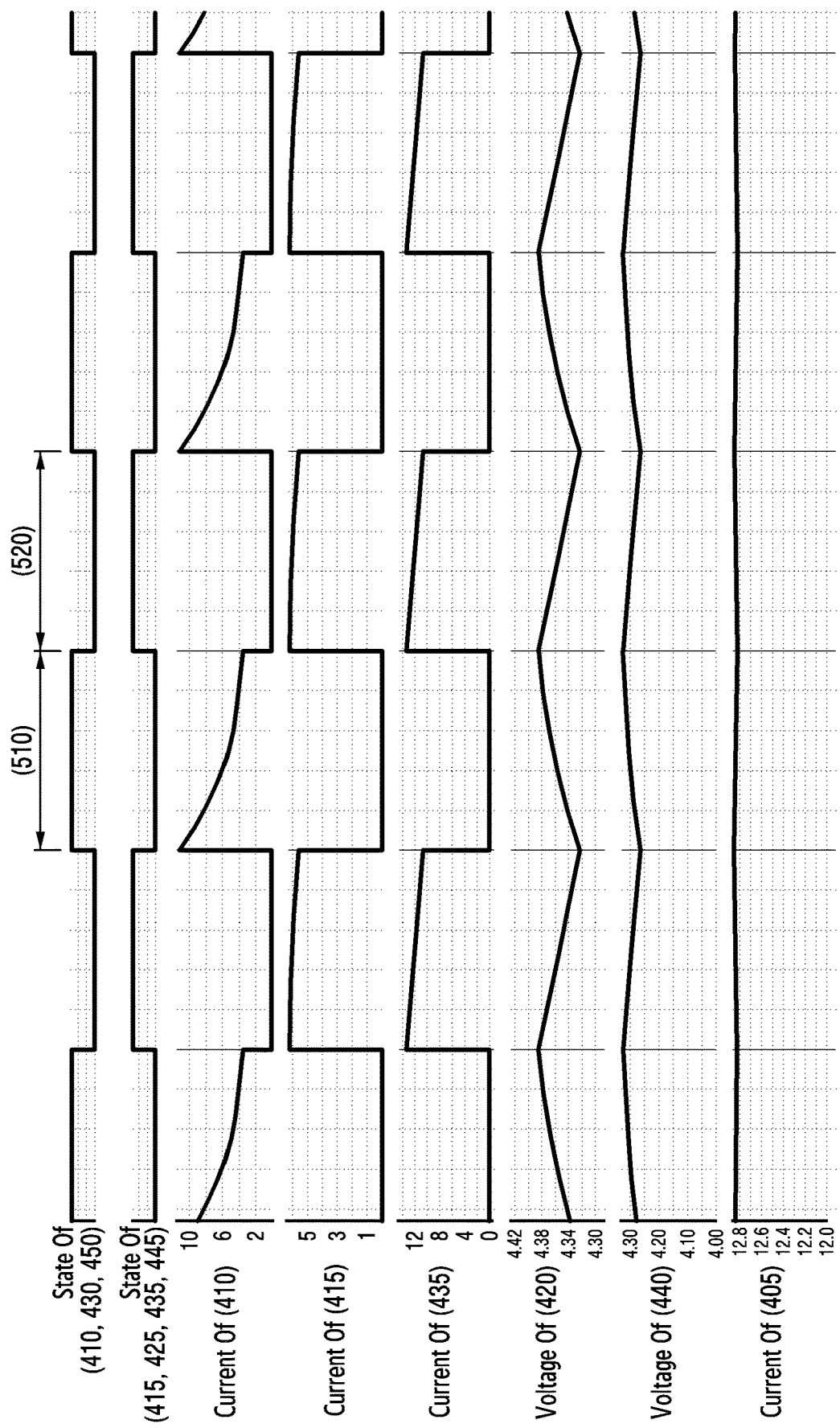
FIG. 5C is a timing diagram of the voltage divider shown in FIG. 5A to FIG. 5B.

FIG. 5C is a timing diagram of the voltage divider 310 shown in FIG. 5A to FIG. 5B.

For example, referring to FIG. 5A, the processor 120 may set a state of the first switch 410, the fourth switch 430, and the seventh switch 450 to a short circuit state and set a state of the remaining switches to an open circuit state, such that the first capacitor 420 and the second capacitor 440 are initialized. The processor 120 may control the foregoing on the basis of receiving an indicator indicating that the first voltage is triple or three times the charging voltage of the battery 189. The initialization of each of the first capacitor and the second capacitor may be performed using a linear regulator or switching regulator electrically connected with the voltage divider 310. By shorting the first switch 410, fourth switch 430, and the seventh switch 450, the first capacitor 420 and the second capacitor 440 are be connected in series with respect to the input terminal 405 and the output terminal 455. On the basis of the series connection, the first capacitor 420 and the second capacitor 440 may be charged based on the first voltage received from the external electronic device and the charging voltage of the battery 189.

Referring to FIG. 5C, the processor 120 may set a state of the first switch 410, the fourth switch 430, and the seventh switch 450 to the first state (short circuit, electrical connection), and set a state of the second switch 415, the third switch 425, the fifth switch 435, and the sixth switch 445 to the second state (open circuit, electrical disconnection), within a first time period 510. By the control of the processor 120 within the first time period 510, the first capacitor 420 and the second capacitor 440 may be series connected with respect to each of the input terminal 405 and the output terminal 455, and be charged based on the series connection. On the basis of the charging, the first capacitor 420 may get a target voltage (e.g., about 4.38 V) corresponding to the charging voltage of the battery 189 at the end of the first time period 510. On the basis of the charging, the second capacitor 440 may get a target voltage (e.g., about 4.32 V) corresponding to the charging voltage of the battery 189 at the end of the first time period 510. On the other hand, a current applied to the first switch 410, a current applied to the second switch 415, and a current applied to the fifth switch 435 may be changed by the charging of the first capacitor 420 and the second capacitor 440.

After the first capacitor 420 and the second capacitor 440 get the charging voltage (or the target voltage) by the charging, the processor 120 may switch the state of the first switch 410 to the seventh switch 450.

For example, referring to FIG. 5B, after the first capacitor 420 and the second capacitor 440 attain the charging voltage (or the target voltage) during first time period 510, the processor 120 may switch a state of the first switch 410, the fourth switch 430, and the seventh switch 450 into the second state, and switch a state of the second switch 415, the third switch 425, the fifth switch 435, and the sixth switch 445 into the first state. On the basis of the switching of the state of the first switch 410 to the seventh switch 450 of the processor 120, the first capacitor 420 and the second capacitor 440 may be electrically disconnected with the input terminal 405 and be connected in parallel with respect to the battery 189 electrically connected to the output terminal 455. On the basis of the switching of the state of the first switch 410 to the seventh switch 450 of the processor 120, the first capacitor 420 and the second capacitor 440 may be discharged. On the basis of the discharging, the voltage divider 310 may present power for applying a second voltage corresponding to the charging voltage to the battery 189 through the output terminal 455, to the battery 189. On the basis of the discharging of the first capacitor 420 and the second capacitor 440, the voltage divider 310 may acquire a current having a magnitude greater than a maximum acceptable current magnitude of the connector 178. For example, the voltage divider 310 may apply the second voltage corresponding to the charging voltage, to the battery 189, and apply a current that is substantially triple (or between 2.75 and 3.25) first current less than a maximum current magnitude of the connector 178 applied from the external electronic device, to the battery 189.

For example, referring to FIG. 5C, the processor 120 may switch a state of the first switch 410, the fourth switch 430, and the seventh switch 450 into the second state, and switch a state of the second switch 415, the third switch 425, the fifth switch 435, and the sixth switch 445 into the first state, within a second time period 520 following the first time period 510. Although FIG. 5C illustrates an example in which a duration of the first time period 510 and a duration of the second time period 520 are the same as each other, the durations may be different from each other in other embodiments.

By the control of the processor 120 within the second time period 520, the first capacitor 420 and the second capacitor 440 may be electrically isolated from the input terminal 405, connected in parallel with respect to the output terminal 455, and be discharged based on the parallel connection. The first capacitor 420 may discharge to a voltage (e.g., about 4.32 V) at the end of the second time period 520. The second capacitor 440 may discharge to a voltage (e.g., about 4.28 V) at the end of the second time period 520. On the other hand, a current applied to the first switch 410, a current applied to the second switch 415, and a current applied to the fifth switch 435 may be changed by the discharging of the first capacitor 420 and the second capacitor 440.

By repeatedly performing a change of the electrical connection shown in FIG. 5A and FIG. 5B on the basis of a time cycle having a duration that is a sum of the first time period 510 and the second time period 520, the processor 120 may perform 3-to-1 voltage division through the voltage divider 310. The electronic device 101 of an embodiment may perform the direct charging of the battery 189 on the basis of a 3-to-1 voltage division ratio.

In one or more embodiments, in response to the first voltage being a double of the charging voltage of the battery 189, the voltage divider 310 may support a 2-to-1 voltage division ratio on the basis of the control of the first switch 410 to the seventh switch 450 of the processor 120.

Figure 6A:
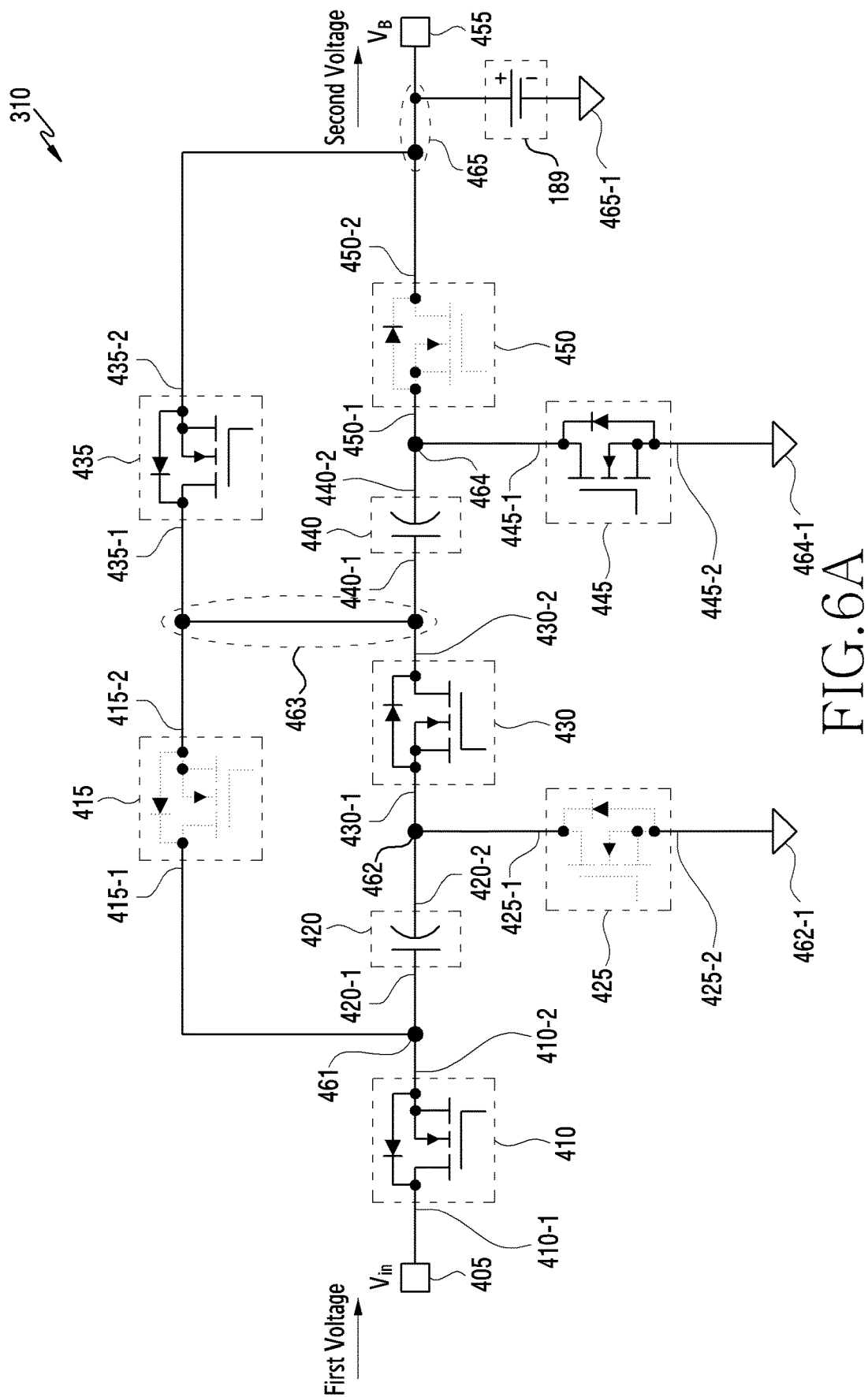
FIG. 6A to FIG. 6B illustrate an example of a connection structure of a voltage divider performing 2-to-1 voltage division according to an embodiment.
Figure 6B:
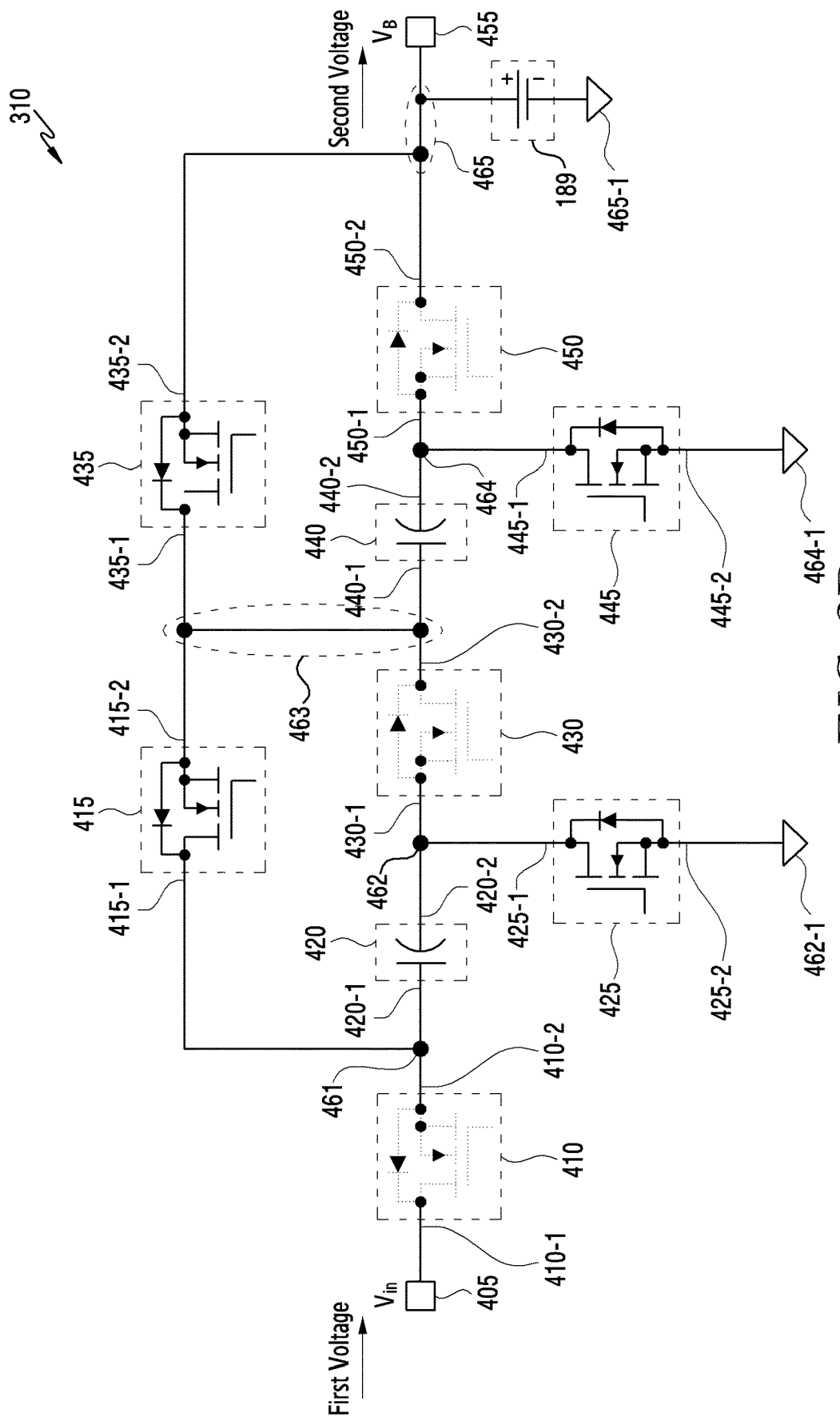

FIG. 6A to FIG. 6B illustrate an example of a connection structure of a voltage divider performing 2-to-1 voltage division according to an embodiment.

Figure 6C:
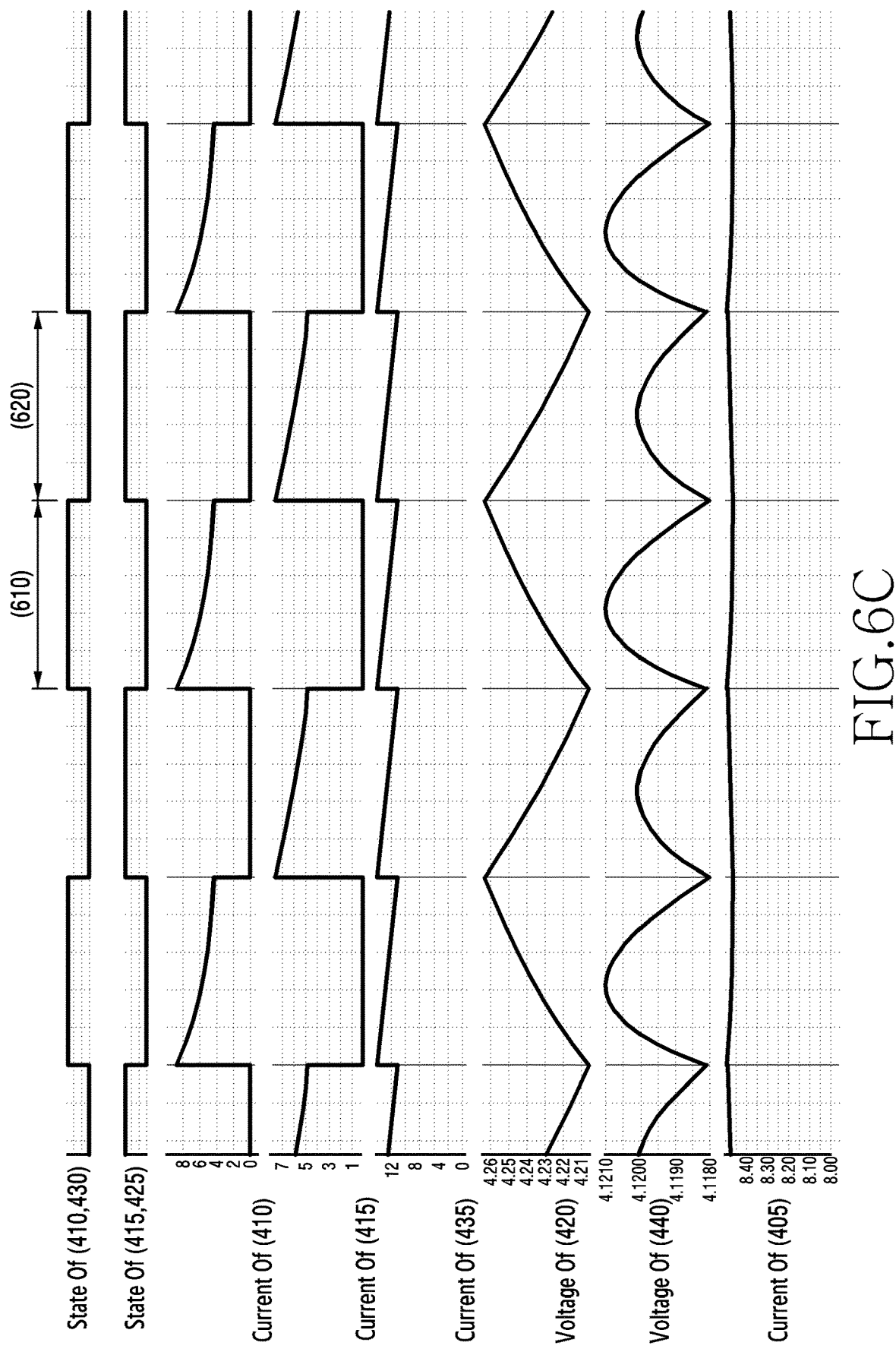
FIG. 6C is a timing diagram of the voltage divider shown in FIG. 6A to FIG. 6B.

FIG. 6C is a timing diagram of the voltage divider shown in FIG. 6A to FIG. 6B.

For example, referring to FIG. 6A, the processor 120 may maintain a state of the fifth switch 435 and the sixth switch 445 as the first state, and maintain a state of the seventh switch 450 as the second state, in a state where the first capacitor 420 and the second capacitor 440 are initialized, on the basis of identifying that the first voltage is a double of the charging voltage of the battery 189 on the basis of the data received from the external electronic device. Also, the processor 120 may set a state of the first switch 410 and the fourth switch 430 to the first state, and set a state of the second switch 415 and the third switch 425 to the second state. On the basis of the setting of the state of the first switch 410 to the seventh switch 450 of the processor 120, the first capacitor 420 may be connected in series with respect to each of the input terminal 405 and the output terminal 455. On the basis of the series connection, the first capacitor 420 may be charged based on the first voltage received from the external electronic device and the charging voltage of the battery 189.

For example, referring to FIG. 6C, the processor 120 may set the state of the first switch 410 and the fourth switch 430 to the first state, and set the state of the second switch 415 and the third switch 425 to the second state, within a first time period 610. Although not illustrated in FIG. 6C, the processor 120 may maintain the state of the fifth switch 435 and the sixth switch 445 as the first state, and maintain the state of the seventh switch 450 as the second state, within the first time period 610 and a second time period 620 following the first time period 610. FIG. 6C illustrates an example in which a duration of the first time period 610 and a duration of the second time period 620 are the same as each other, but the duration of the first time period 610 and the duration of the second time period 620 may be different from each other according to embodiments as well. By the control of the processor 120 within the first time period 610, the first capacitor 420 may be series connected with respect to each of the input terminal 405 and the output terminal 455, and be charged based on the series connection. On the basis of the charging, the first capacitor 420 may charge to a target voltage (e.g., about 4.27 V) corresponding to the charging voltage of the battery 189 at the end of the first time period 610. On the other hand, a current applied to the first switch 410, a current applied to the second switch 415, and a current applied to the fifth switch 435 may be changed by the charging of the first capacitor 420. On the other hand, by the control of the processor 120 within the first time period 610, the voltage of the second capacitor 440 may be changed within the first time period 610.

After the first capacitor 420 is charged to the charging voltage (or the target voltage), the processor 120 may switch the state of the first switch 410 to the fourth switch 430.

For example, referring to FIG. 6B, after the first capacitor 420 gets the charging voltage (or the target voltage) by the charging, the processor 120 may switch the state of the first switch 410 and the fourth switch 430 into the second state, and switch the state of the second switch 415 and the third switch 425 into the first state. On the other hand, the state of the fifth switch 435 and the sixth switch 445 may be maintained as the first state, and the state of the seventh switch 450 may be maintained as the second state. On the basis of the switching of the state of the first switch 410 to the fourth switch 430 of the processor 120, the first capacitor 420 may be electrically disconnected with the input terminal 405 and be connected in parallel with respect to the battery 189 electrically connected to the output terminal 455. On the basis of the switching of the state of the first switch 410 to the fourth switch 430 of the processor 120, the first capacitor 420 may be discharged. On the basis of the discharging, the voltage divider 310 may provide power for applying the second voltage corresponding to the charging voltage to the battery 189 through the output terminal 455, to the battery 189. On the basis of the discharging of the first capacitor 420, the voltage divider 310 may acquire a current having a magnitude greater than a maximum acceptable current magnitude of the connector 178. For example, the voltage divider 310 may apply the second voltage corresponding to the charging voltage to the battery 189, and apply a current that is a double of a first current less than the maximum current magnitude of the connector 178 applied from the external electronic device, to the battery 189.

For example, referring to FIG. 6C, the processor 120 may switch the state of the first switch 410 and the fourth switch 430 into the second state, and switch the state of the second switch 415 and the third switch 425 into the first state, within the second time period 620 following the first time period 610. By the control of the processor 120 within the second time period 620, the first capacitor 420 may be electrically isolated from the input terminal 405 and be parallel connected with respect to the output terminal 455, and be discharged based on the parallel connection. On the basis of the discharging, the first capacitor 420 may discharge to a voltage (e.g., about 4.21 V) decreased at the end of the second time period 620. On the other hand, a current applied to the first switch 410, a current applied to the second switch 415, and a current applied to the fifth switch 435 may be changed by the discharging of the first capacitor 420. By repeatedly performing a change of the electrical connection shown in FIG. 6A and FIG. 6B on the basis of a time cycle having a duration that is a sum of the first time period 610 and the second time period 620, the processor 120 may perform 2-to-1 voltage division through the voltage divider 310. The electronic device 101 of an embodiment may perform the direct charging of the battery 189 on the basis of a 2-to-1 voltage division ratio.

Figure 7A:
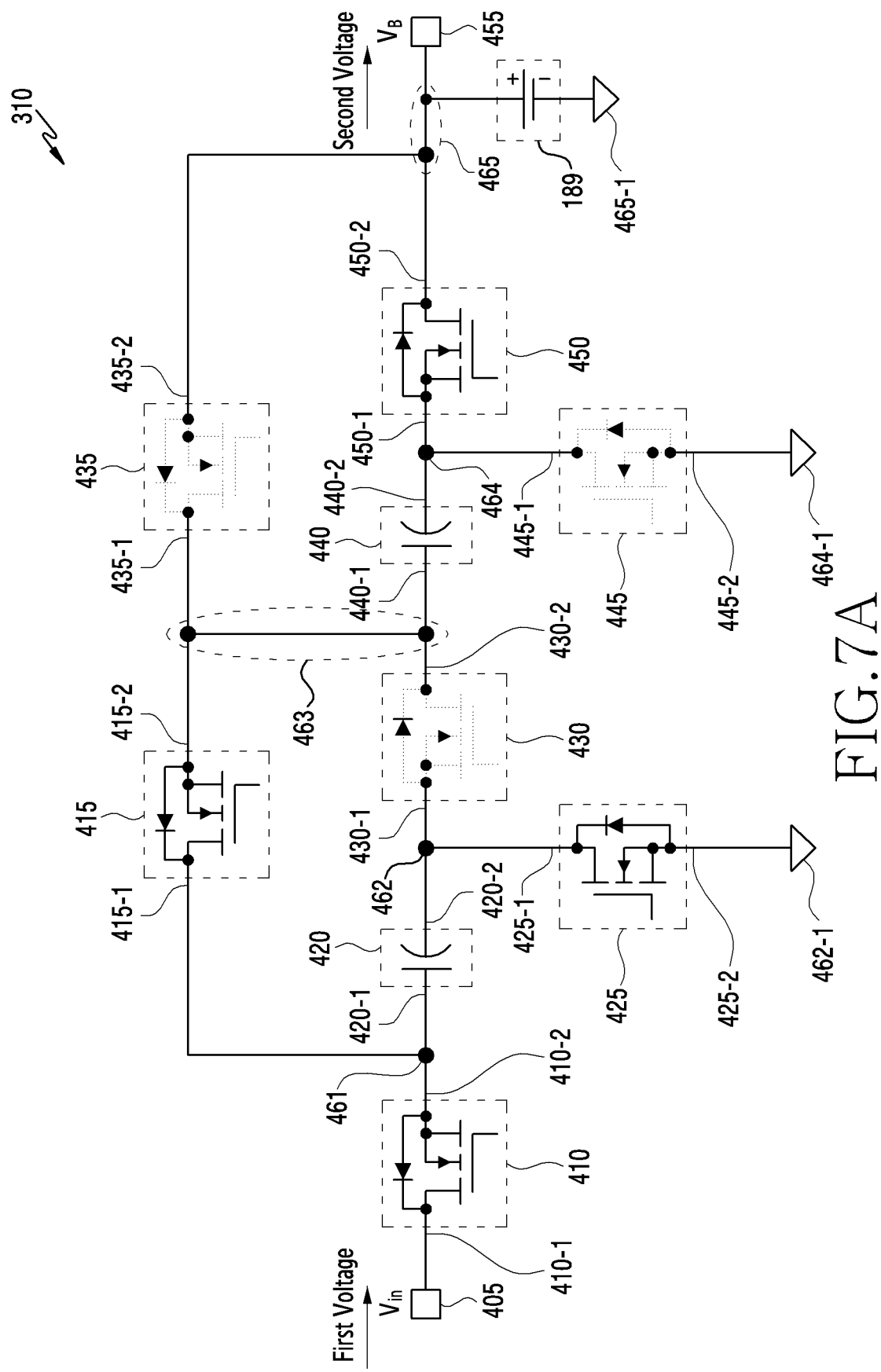
FIG. 7A to FIG. 7B illustrate another example of a connection structure of a voltage divider performing 2-to-1 voltage division according to an embodiment.
Figure 7B:
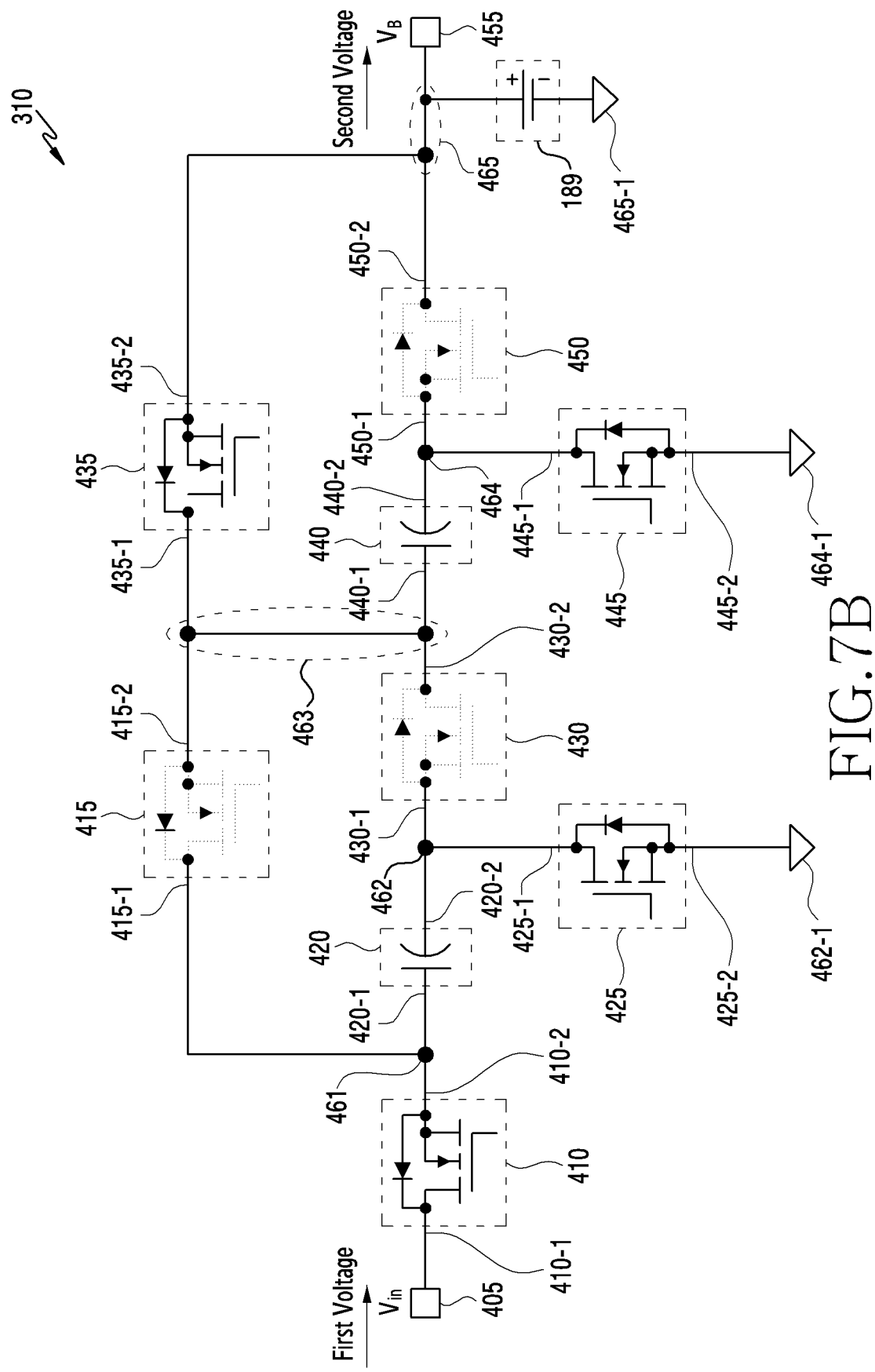

FIG. 7A to FIG. 7B illustrate another example of a connection structure of a voltage divider performing 2-to-1 voltage division according to an embodiment.

FIG. 7C is a timing diagram of the voltage divider shown in FIG. 7A to FIG. 7B.

For another example, referring to FIG. 7A, the processor 120 may maintain the state of the first switch 405 and the third switch 425 as the first state, and maintain the state of the fourth switch 430 as the second state, and set the state of the second switch 415 and the seventh switch 450 as the first state, and set the state of the fifth switch 435 and the sixth switch 445 as the second state, in a state where the first capacitor 420 and the second capacitor 440 are initialized, on the basis of identifying that the first voltage is a double of the charging voltage of the battery 189 on the basis of the data received from the external electronic device. On the basis of the setting of the state of the first switch 410 to the seventh switch 450 of the processor 120, the second capacitor 440 may be connected in series with respect to each of the input terminal 405 and the output terminal 455. On the basis of the series connection, the second capacitor 440 may be charged based on the first voltage received from the external electronic device and the charging voltage of the battery 189. For the sake of the series connection, a load of the first capacitor 420 shown in FIG. 6A may be smaller than a load of the second capacitor 440 shown in FIG. 7A, so the electrical connection shown in FIG. 6A may be advantageous in aspects of device selection. However, an embodiment is not limited to this.

For example, referring to FIG. 7C, the processor 120 may set the state of the second switch 415 and the seventh switch 450 to the first state, and set the state of the fifth switch 435 and the sixth switch 445 to the second state, within a first time period 710. Although not illustrated in FIG. 6C, the processor 120 may maintain the state of the first switch 405 and the third switch 425 as the first state, and maintain the state of the fourth switch 430 as the second state, within the first time period 710 and a second time period 720 following the first time period 710. FIG. 7C illustrates an example in which a duration of the first time period 710 and a duration of the second time period 720 are the same as each other, but the duration of the first time period 710 and the duration of the second time period 720 may be different from each other according to embodiments as well. By the control of the processor 120 within the first time period 710, the second capacitor 440 may be series connected with respect to each of the input terminal 405 and the output terminal 455, and be charged based on the series connection. On the basis of the charging, the second capacitor 440 may get a target voltage (e.g., about 4.20 V) corresponding to the charging voltage of the battery 189 at the end of the first time period 710. On the other hand, a current applied to the first switch 410, a current applied to the second switch 415, and a current applied to the fifth switch 435 may be changed by the charging of the second capacitor 440. On the other hand, by the control of the processor 120 within the first time period 710, the voltage of the first capacitor 420 may be changed within the first time period 710.

After the second capacitor 440 gets the charging voltage (or the target voltage) by the charging, the processor 120 may switch the state of the second switch 415, the fifth switch 435, the sixth switch 445, and the seventh switch 450.

For example, referring to FIG. 7B, after the second capacitor 440 gets the charging voltage (or the target voltage) by the charging, the processor 120 may switch the state of the second switch 415 and the seventh switch 450 into the second state, and switch the state of the fifth switch 435 and the sixth switch 445 into the first state. On the other hand, the state of the first switch 405 and the third switch 425 may be maintained as the first state, and the state of the fourth switch 430 may be maintained as the second state. On the basis of the switching of the state of the second switch 415, the fifth switch 435, the sixth switch 445, and the seventh switch 450 of the processor 120, the second capacitor 440 may be electrically disconnected with the input terminal 405 and be connected in parallel with respect to the battery 189 electrically connected to the output terminal 455. On the basis of the switching of the state of the second switch 415, the fifth switch 435, the sixth switch 445, and the seventh switch 450 of the processor 120, the second capacitor 440 may be discharged. On the basis of the discharging, the voltage divider 310 may present power for applying the second voltage corresponding to the charging voltage to the battery 189 through the output terminal 455, to the battery 189. On the basis of the discharging of the second capacitor 440, the voltage divider 310 may acquire a current having a magnitude greater than a maximum acceptable current magnitude of the connector 178. For example, the voltage divider 310 may apply the second voltage corresponding to the charging voltage to the battery 189, and apply a current that is a double of a first current less than the maximum current magnitude of the connector 178 applied from the external electronic device, to the battery 189.

For example, referring to FIG. 7C, the processor 120 may switch the state of the second switch 415 and the seventh switch 450 into the second state, and switch the state of the fifth switch 435 and the sixth switch 445 into the first state, within the second time period 720 following the first time period 710. By the control of the processor 120 within the second time period 720, the second capacitor 440 may be electrically isolated from the input terminal 405, and be parallel connected with respect to the output terminal 455, and be discharged based on the parallel connection. On the basis of the discharging, the second capacitor 440 may discharge to a voltage (e.g., about 4.14 V) at the end of the second time period 720. On the other hand, a current applied to the first switch 410, a current applied to the second switch 415, and a current applied to the fifth switch 435 may be changed by the discharging of the second capacitor 440. By repeatedly performing a change of the electrical connection shown in FIG. 7A and FIG. 7B on the basis of a time cycle having a duration that is a sum of the first time period 710 and the second time period 720, the processor 120 may perform 2-to-1 voltage division through the voltage divider 310. The electronic device 101 of an embodiment may perform the direct charging of the battery 189 on the basis of a 2-to-1 voltage division ratio.

In one or more embodiments, in response to the first voltage corresponding to the charging voltage of the battery 189, the voltage divider 310 may support a 1-to-1 voltage division ratio on the basis of the control of the first switch 410 to the seventh switch 450 of the processor 120.

Figure 8:
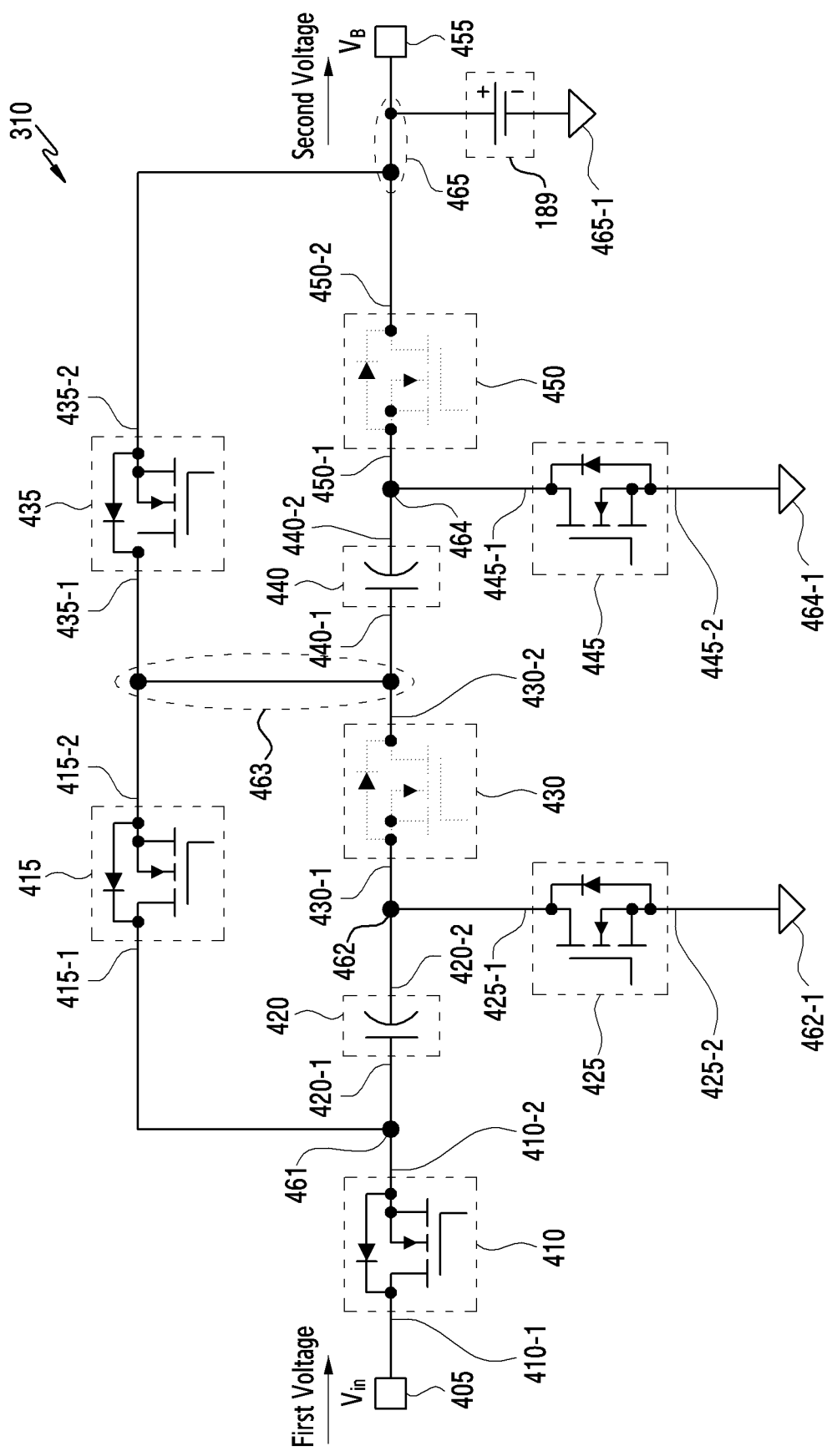
FIG. 8 illustrates an example of a connection structure of a voltage divider performing 1-to-1 voltage division according to an embodiment.

FIG. 8 illustrates an example of a connection structure of a voltage divider performing 1-to-1 voltage division according to an embodiment.

For example, referring to FIG. 8, the processor 120 may maintain the state of the first switch 410, the second switch 415, the third switch 425, the fifth switch 435, and the sixth switch 445 as the first state, and maintain the state of the fourth switch 430 and the seventh switch 450 as the second state, on the basis of identifying that the first voltage corresponds to the charging voltage of the battery 189 on the basis of the data received from the external electronic device. As a result, the input terminal 405 may be connected directly to the output terminal 455, and the first voltage applied from the external electronic device may be applied to the battery 189, and a first current less than a maximum current magnitude of the connector 178 applied from the external electronic device may be applied.

As mentioned above, the electronic device 101 of one or more embodiments may include the voltage divider 310 capable of charging the battery 189 through a high-speed charging performance maintaining compatibility while being improved, by adaptively supporting a 3-to-1 voltage division ratio, a 2-to-1 voltage division ratio, and a 1-to-1 voltage division ratio.

The voltage divider 310 is not limited to the circuit of FIG. 4. For example, referring to FIG. 9, the voltage divider 310 may include an input terminal 905, a first switch 910, a second switch 915, a first capacitor 920, a third switch 925, a fourth switch 930, a fifth switch 935, a second capacitor 940, a sixth switch 945, a seventh switch 950, and an output terminal 955. In one or more embodiments, the control of the first switch 910 to the seventh switch 950 may be carried out by the processor 120.

In one or more embodiments, the input terminal 905 may be electrically connected with the external electronic device via the connector 178. The first switch 910 may include a first terminal 910-1 and a second terminal 910-2. The second switch 915 may include a third terminal 915-1 and a fourth terminal 915-2. The first capacitor 920 may include a fifth terminal 920-1 and a sixth terminal 920-2. The third switch 925 may include a seventh terminal 925-1, and an eighth terminal 925-2 electrically connected with the ground. The fourth switch 930 may include a ninth terminal 930-1 and a tenth terminal 930-2. The fifth switch 935 may include an eleventh terminal 935-1 and a twelfth terminal 935-2. The second capacitor 940 may include a thirteenth terminal 940-1 and a fourteenth terminal 940-2. The sixth switch 945 may include a fifteenth terminal 945-1 and a sixteenth terminal 945-2. The seventh switch 950 may include a seventeenth terminal 950-1, and an eighteenth terminal 950-2 electrically connected with the ground. The output terminal 955 may be electrically connected with the battery 189.

In one or more embodiments, the first switch 910 may be disposed between the input terminal 905 and a first node 961. The second switch 915 may be disposed between the first node 961 and a fifth node 965. The first capacitor 920 may be disposed between the first node 961 and a second node 962. The third switch 925 may be disposed between the second node 962 and a first ground node 962-1. The fourth switch 930 may be disposed between the second node 962 and a third node 963. The fifth switch 935 may be disposed between the third node 963 and the fifth node 965. The second capacitor 940 may be disposed between the third node 963 and a fourth node 964. The sixth switch 945 may be disposed between the fourth node 964 and the fifth node 965. The seventh switch 950 may be disposed between the fourth node 964 and a second ground node 964-1. The output terminal 955 may correspond to the fifth node 965. The battery 189 may be disposed between the fifth node 965 and a third ground node 965-1.

According to an embodiment, the first ground node 962-1, the second ground node 964-1 and/or the third ground node 965-1 may be electrically connected.

Figure 9:
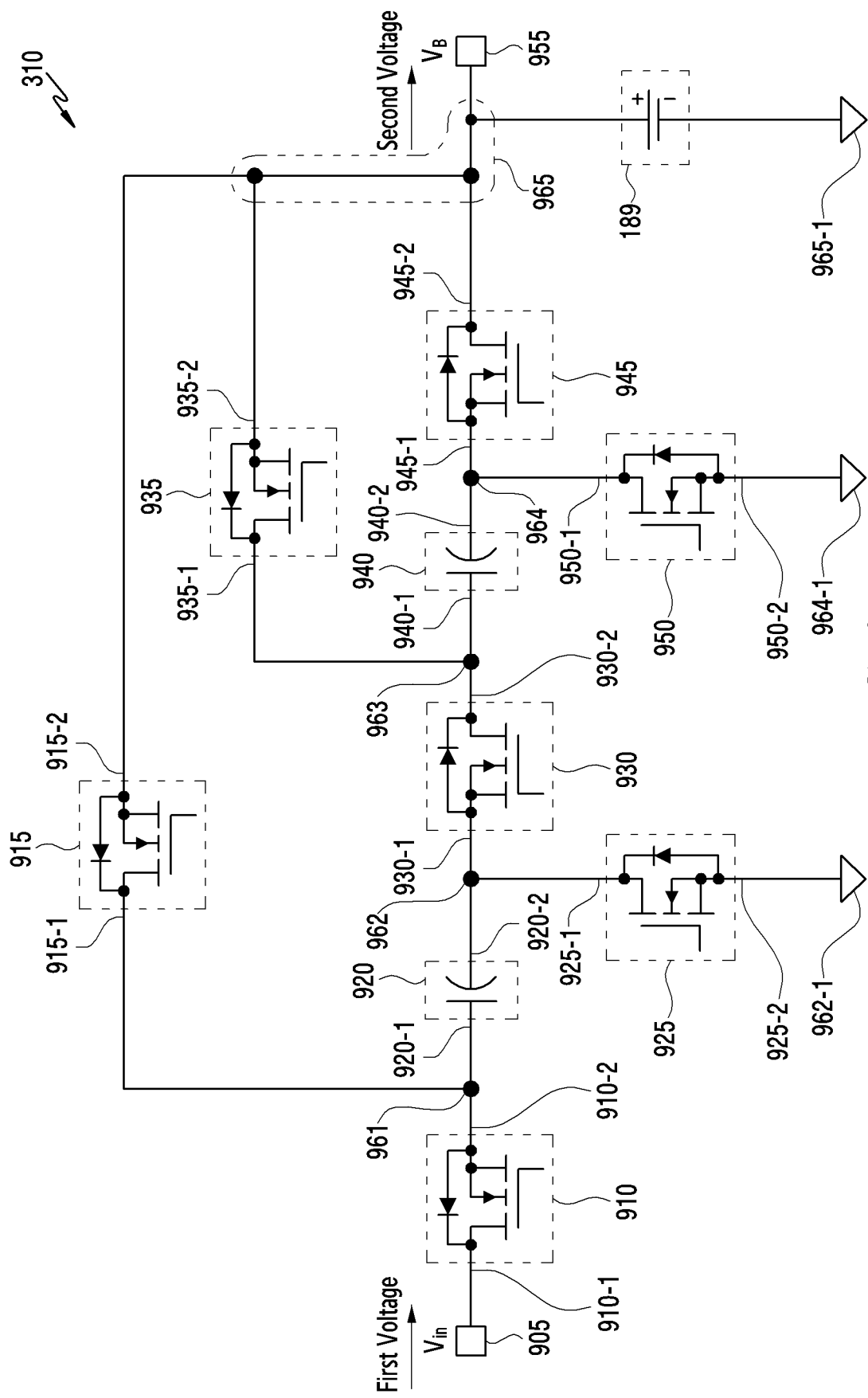
FIG. 9 illustrates another example of a voltage divider according to an embodiment.

Although not illustrated in FIG. 9, in an embodiment, the input terminal may be further connected with a third capacitor that is an input capacitor.

FIG. 9 to FIG. 11 illustrate an example in which the voltage divider 310 includes two capacitors (e.g., the first capacitor 920 and the second capacitor 940) and seven switches (e.g., the first switch 910 to the seventh switch 950) in order to support three voltage division ratios, but the voltage divider 310 of certain embodiments may include three or more capacitors and eight or more switches, thereby supporting four or more voltage division ratios as well.

In one or more embodiments, in response to the first voltage being substantially triple (or between 2.75 and 3.25 times) the charging voltage of the battery 189, the voltage divider 310 may support a 3-to-1 voltage division ratio on the basis of the control of the first switch 910 to the seventh switch 950 of the processor 120.

Figure 10A:
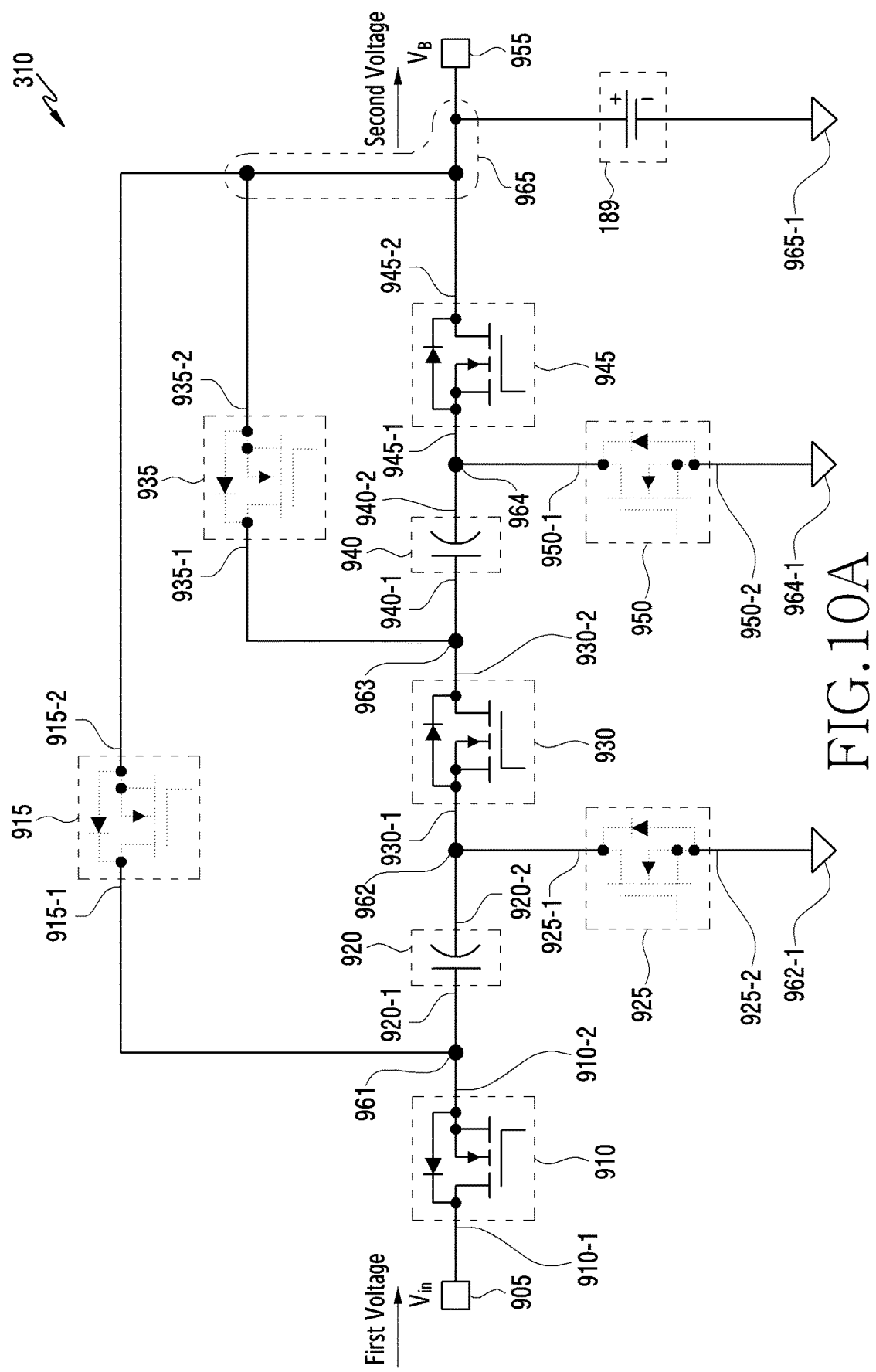
FIG. 10A to FIG. 10B illustrate another example of a connection structure of a voltage divider performing 3-to-1 voltage division according to an embodiment.
Figure 10B:
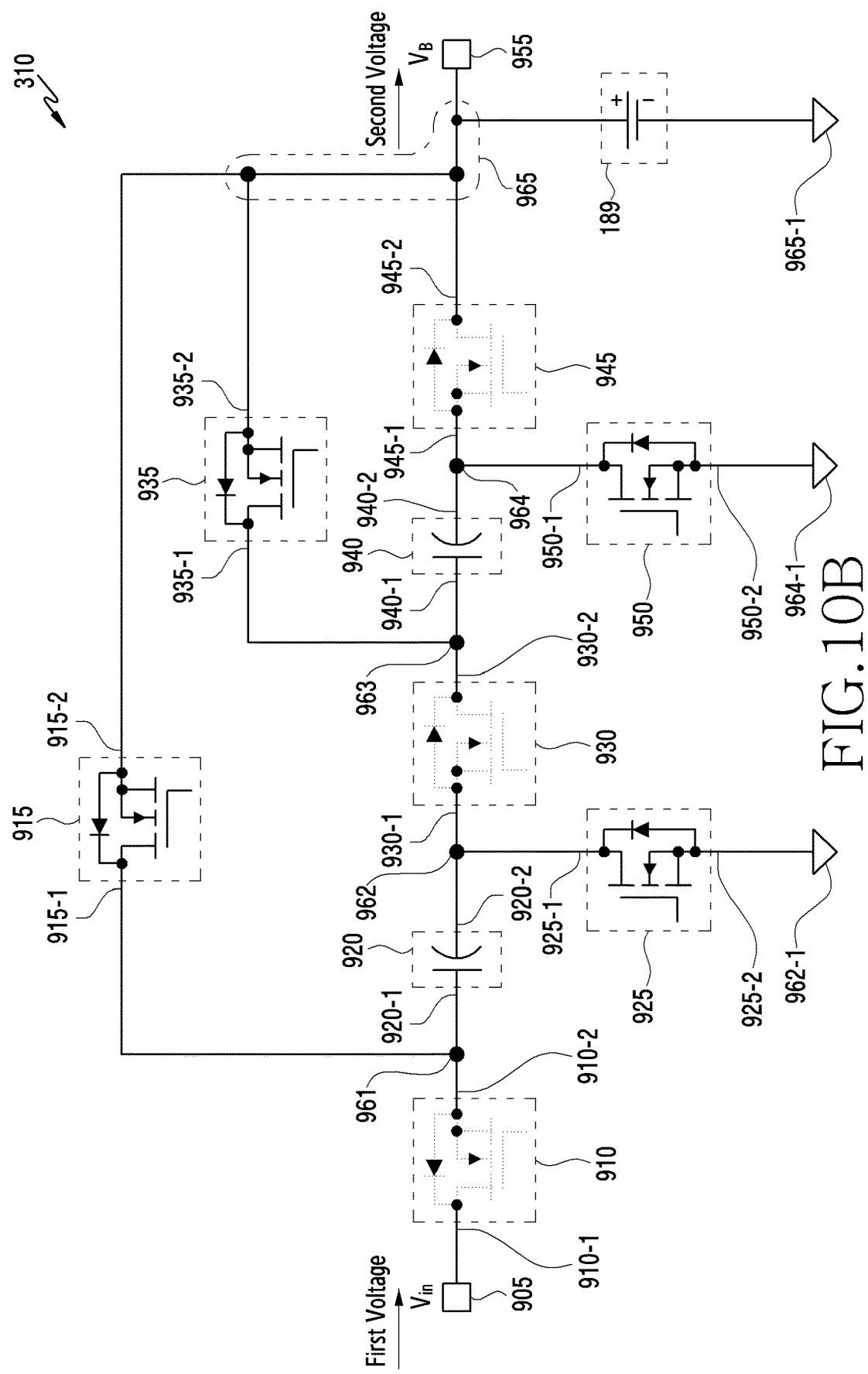

FIG. 10A to FIG. 10B illustrate another example of a connection structure of a voltage divider performing 3-to-1 voltage division according to an embodiment.

Figure 10C:
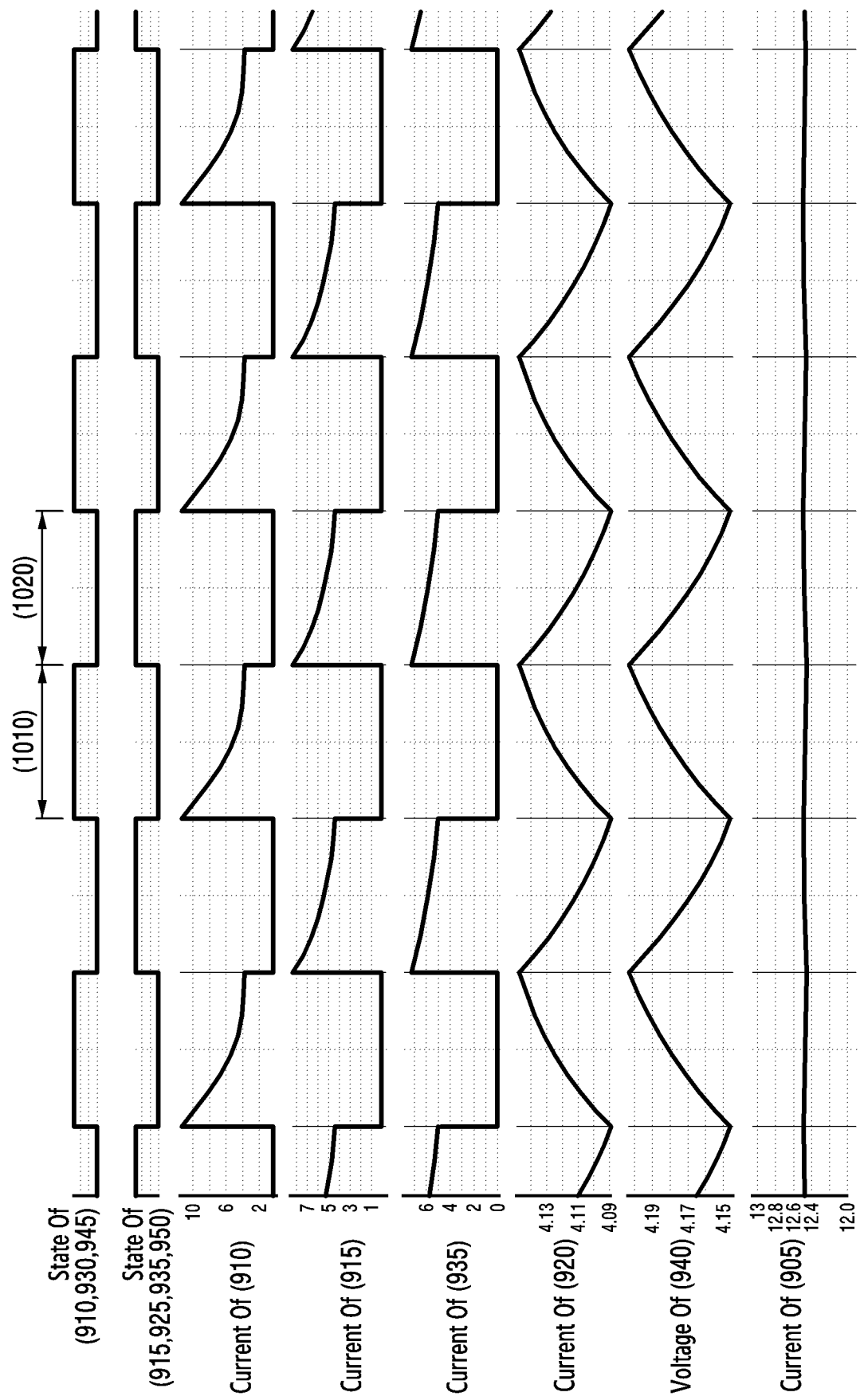
FIG. 10C is a timing diagram of the voltage divider shown in FIG. 10A to FIG. 10B.

FIG. 10C is a timing diagram of the voltage divider shown in FIG. 10A to FIG. 10B.

For example, referring to FIG. 10A, the processor 120 may set a state of the first switch 910, the fourth switch 930, and the sixth switch 945 to the first state and set a state of the remaining switches to the second state, in a state where the first capacitor 920 and the second capacitor 940 are initialized, on the basis of identifying that the first voltage is substantially triple (or between 2.75 and 3.25 times) the charging voltage of the battery 189 on the basis of the data received from the external electronic device. On the basis of the setting of the state of the first switch 910 to the seventh switch 950 of the processor 120, the first capacitor 920 and the second capacitor 940 may be connected in series with respect to each of the input terminal 905 and the output terminal 955. On the basis of the series connection, the first capacitor 920 and the second capacitor 940 may be charged based on the first voltage received from the external electronic device and the charging voltage of the battery 189.

For example, referring to FIG. 10C, the processor 120 may set the state of the first switch 910, the fourth switch 930, and the sixth switch 945 to the first state, and set the state of the second switch 915, the third switch 925, the fifth switch 935, and the sixth switch 950 to the second state, within a first time period 1010. By the control of the processor 120 within the first time period 1010, the first capacitor 920 and the second capacitor 940 may be series connected with respect to each of the input terminal 905 and the output terminal 955, and be charged based on the series connection. On the basis of the charging, the first capacitor 920 may get a target voltage (e.g., about 4.15 V) corresponding to the charging voltage of the battery 189 at the end of the first time period 1010. On the basis of the charging, the second capacitor 940 may get a target voltage (e.g., about 4.21 V) corresponding to the charging voltage of the battery 189 at the end of the first time period 1010. On the other hand, a current applied to the first switch 910, a current applied to the second switch 915, and a current applied to the fifth switch 935 may be changed by the charging of the first capacitor 920 and the second capacitor 940.

After the first capacitor 920 and the second capacitor 940 are charged to the target voltage, the processor 120 may switch the state of the first switch 910 to the seventh switch 950.

For example, referring to FIG. 10B, after the first capacitor 920 and the second capacitor 940 are charged to the target voltage, the processor 120 may switch the state of the first switch 910, the fourth switch 930, and the sixth switch 945 into the second state, and switch the state of the second switch 415, the third switch 425, the fifth switch 435, and the seventh switch 950 into the first state. On the basis of the switching of the state of the first switch 910 to the seventh switch 950 of the processor 120, the first capacitor 920 and the second capacitor 940 may be electrically disconnected with the input terminal 905, and be connected in parallel with respect to the battery 189 electrically connected to the output terminal 955. On the basis of the switching of the state of the first switch 910 to the seventh switch 950 of the processor 120, the first capacitor 920 and the second capacitor 940 may be discharged. On the basis of the discharging, the voltage divider 310 may present power for applying the second voltage corresponding to the charging voltage to the battery 189 through the output terminal 955, to the battery 189. On the basis of the discharging of the first capacitor 920 and the second capacitor 940, the voltage divider 310 may acquire a current having a magnitude greater than a maximum acceptable current magnitude of the connector 178. For example, the voltage divider 310 may apply the second voltage corresponding to the charging voltage to the battery 189, and apply a current that is substantially triple (or between 2.75 and 3.25 times) the first current less than the maximum current magnitude of the connector 178 applied from the external electronic device, to the battery 189.

For example, referring to FIG. 10C, the processor 120 may switch the state of the first switch 910, the fourth switch 930, and the sixth switch 945 into the second state, and switch the state of the second switch 915, the third switch 925, the fifth switch 935, and the seventh switch 950 into the first state, within a second time period 1020 following the first time period 1010. FIG. 10C illustrates an example in which a duration of the first time period 1010 and a duration of the second time period 1020 are the same as each other, but the duration of the first time period 1010 and the duration of the second time period 1020 may be different from each other according to embodiments as well. By the control of the processor 120 within the second time period 1020, the first capacitor 920 and the second capacitor 940 may be electrically isolated from the input terminal 905, and be parallel connected with respect to the output terminal 955, and be discharged based on the parallel connection. On the basis of the discharging, the first capacitor 920 may discharge to a voltage (e.g., about 4.08 V) at the end of the second time period 1020. On the basis of the discharging, the second capacitor 940 may discharge to a voltage (e.g., about 4.14 V) at the end of the second time period 1020. On the other hand, a current applied to the first switch 910, a current applied to the second switch 915, and a current applied to the fifth switch 935 may be changed by the discharging of the first capacitor 920 and the second capacitor 940. By repeatedly performing a change of the electrical connection shown in FIG. 10A and FIG. 10B on the basis of a time cycle having a duration that is a sum of the first time period 1010 and the second time period 1020, the processor 120 may perform 3-to-1 voltage division through the voltage divider 310. The electronic device 101 of an embodiment may perform the direct charging of the battery 189 on the basis of a 3-to-1 voltage division ratio.

In one or more embodiments, in response to the first voltage being a double of the charging voltage of the battery 189, the voltage divider 310 may support a 2-to-1 voltage division ratio on the basis of the control of the first switch 910 to the seventh switch 950 of the processor 120.

Figure 11A:
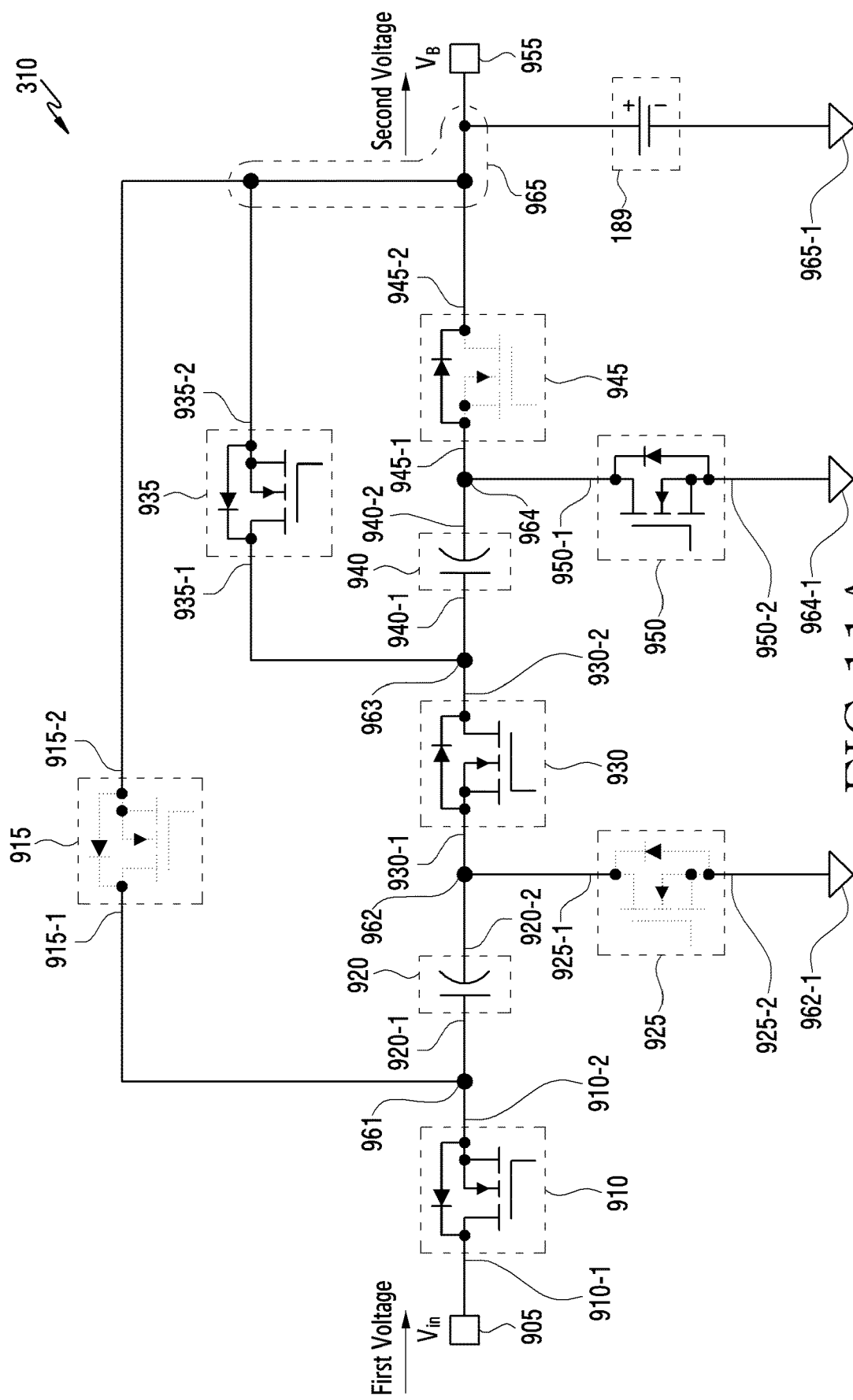
FIG. 11A to FIG. 11B illustrate a further example of a connection structure of a voltage divider performing 2-to-1 voltage division according to an embodiment.
Figure 11B:
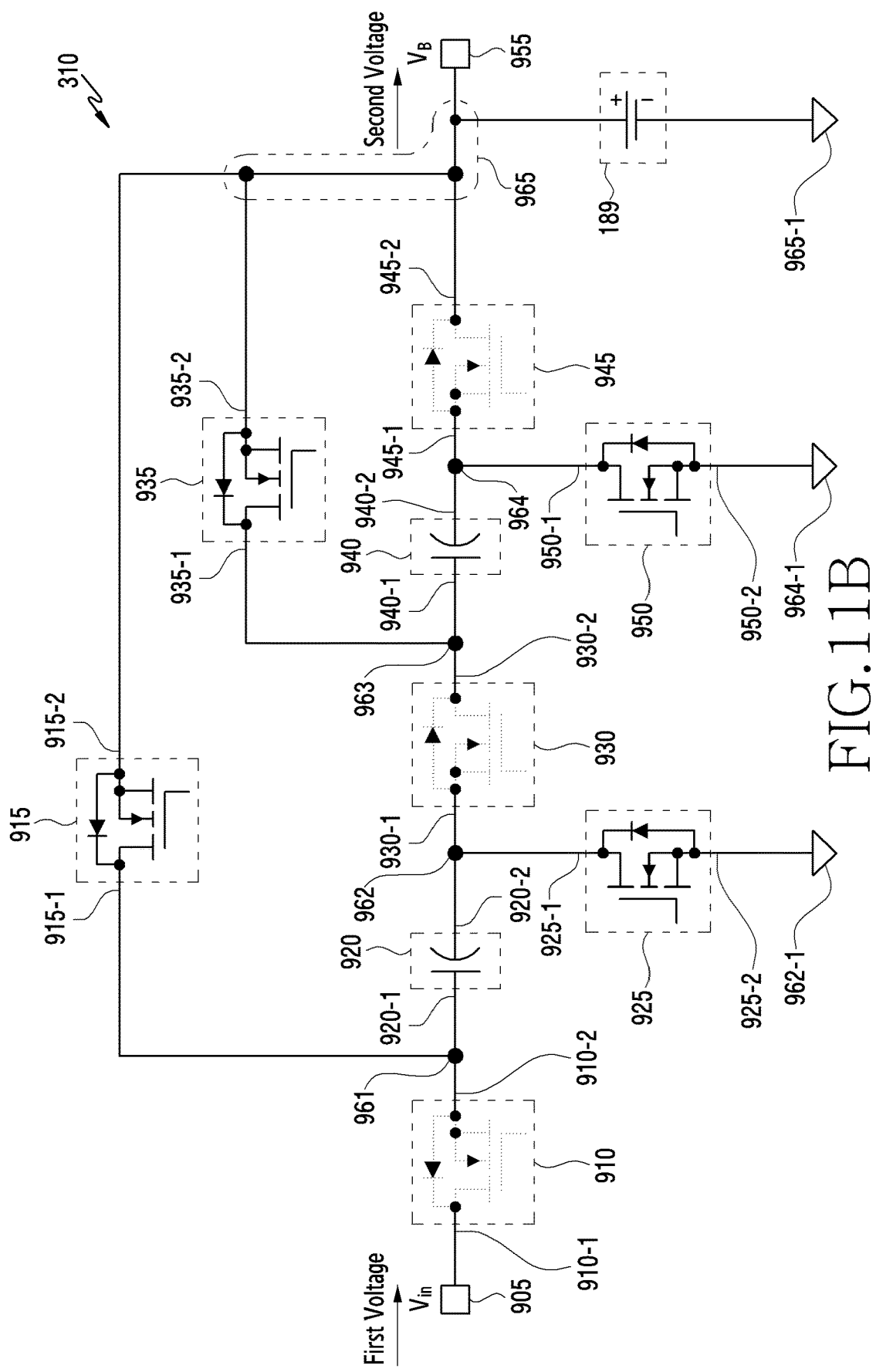

FIG. 11A to FIG. 11B illustrate a further example of a connection structure of a voltage divider performing 2-to-1 voltage division according to an embodiment.

Figure 11C:
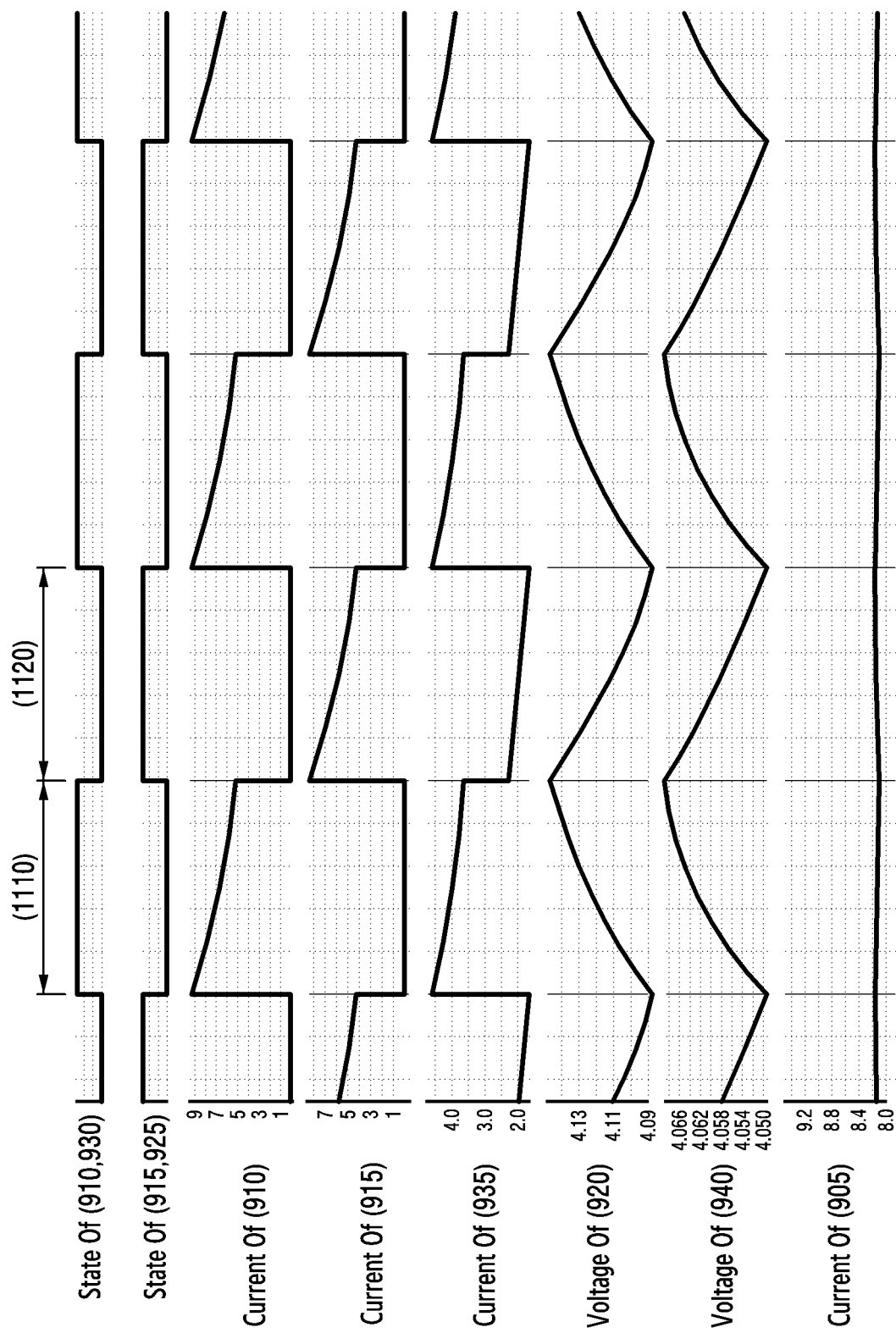
FIG. 11C is a timing diagram of the voltage divider shown in FIG. 11A to FIG. 11B.

FIG. 11C is a timing diagram of the voltage divider shown in FIG. 11A to FIG. 11B.

For example, referring to FIG. 11A, the processor 120 may maintain the state of the fifth switch 935 and the seventh switch 950 as the first state, and maintain the state of the sixth switch 945 as the second state, and set the state of the first switch 910 and the fourth switch 930 to the first state, and set the state of the second switch 915 and the third switch 925 to the second state, in a state where the first capacitor 920 and the second capacitor 940 are initialized, on the basis of identifying that the first voltage is a double of the charging voltage of the battery 189 on the basis of the data received from the external electronic device. On the basis of the setting of the state of the first switch 910 to the seventh switch 950 of the processor 120, the first capacitor 920 may be connected in series with respect to each of the input terminal 905 and the output terminal 955. On the basis of the series connection, the first capacitor 920 may be charged based on the first voltage received from the external electronic device and the charging voltage of the battery 189.

For example, referring to FIG. 11C, the processor 120 may set a state of the first switch 910 and the fourth switch 930 to the first state, and set a state of the second switch 915 and the third switch 925 to the second state, within a first time period 1110. Although not illustrated in FIG. 11C, the processor 120 may maintain a state of the fifth switch 935 and the seventh switch 950 as the first state, and maintain a state of the sixth switch 945 as the second state, within the first time period 1110 and a second time period 1120 following the first time period 1110. FIG. 11C illustrates an example in which a duration of the first time period 1110 and a duration of the second time period 1120 are the same as each other, but the duration of the first time period 1110 and the duration of the second time period 1120 may be different from each other according to embodiments as well. By the control of the processor 120 within the first time period 1110, the first capacitor 920 may be series connected with respect to each of the input terminal 905 and the output terminal 955, and be charged based on the series connection. On the basis of the charging, the first capacitor 920 may get a target voltage (e.g., about 4.15 V) corresponding to the charging voltage of the battery 189 at the end of the first time period 1110. On the other hand, a current applied to the first switch 910, a current applied to the second switch 915, and a current applied to the fifth switch 935 may be changed by the charging of the first capacitor 920. On the other hand, by the control of the processor 120 within the first time period 1110, the voltage of the second capacitor 940 may be changed within the first time period 1110.

After the first capacitor 920 gets the charging voltage (or the target voltage) by the charging, the processor 120 may switch the state of the first switch 910 to the fourth switch 930.

For example, referring to FIG. 11B, after the first capacitor 920 gets the charging voltage (or the target voltage) by the charging, the processor 120 may switch the state of the first switch 910 and the fourth switch 930 into the second state, and switch the state of the second switch 915 and the third switch 925 into the first state. On the other hand, the state of the fifth switch 935 and the seventh switch 950 may be maintained as the first state, and the state of the sixth switch 945 may be maintained as the second state. On the basis of the switching of the state of the first switch 910 to the fourth switch 930 of the processor 120, the first capacitor 920 may be electrically disconnected with the input terminal 905, and be connected in parallel with respect to the battery 189 electrically connected to the output terminal 955. On the basis of the switching of the state of the first switch 910 to the fourth switch 930 of the processor 120, the first capacitor 920 may be discharged. On the basis of the discharging, the voltage divider 310 may present power for applying the second voltage corresponding to the charging voltage to the battery 189 through the output terminal 955, to the battery 189. On the basis of the discharging of the first capacitor 420, the voltage divider 310 may acquire a current having a magnitude greater than a maximum acceptable current magnitude of the connector 178. For example, the voltage divider 310 may apply the second voltage corresponding to the charging voltage to the battery 189, and apply a current that is a double of a first current less than the maximum current magnitude of the connector 178 applied from the external electronic device, to the battery 189.

For example, referring to FIG. 11C, the processor 120 may switch the state of the first switch 910 and the fourth switch 930 into the second state, and switch the state of the second switch 915 and the third switch 925 into the first state, within the second time period 1120 following the first time period 1110. By the control of the processor 120 within the second time period 1120, the first capacitor 920 may be electrically isolated from the input terminal 905, and be parallel connected with respect to the output terminal 955, and be discharged based on the parallel connection. On the basis of the discharging, the first capacitor 920 may discharge to a voltage (e.g., about 4.08 V) at the end of the second time period 1120. On the other hand, a current applied to the first switch 910, a current applied to the second switch 915, and a current applied to the fifth switch 935 may be changed by the charging of the first capacitor 920. By repeatedly performing a change of the electrical connection shown in FIG. 11A and FIG. 11B on the basis of a time cycle having a duration that is a sum of the first time period 1110 and the second time period 1120, the processor 120 may perform 2-to-1 voltage division through the voltage divider 310. The electronic device 101 of an embodiment may perform the direct charging of the battery 189 on the basis of a 2-to-1 voltage division ratio.

In one or more embodiments, in response to the first voltage corresponding to the charging voltage of the battery 189, the voltage divider 310 may support a 1-to-1 voltage division ratio by using the voltage divider 310 shown in FIG. 9, on the basis of the control of the first switch 410 to the seventh switch 450 of the processor 120. For example, although not illustrated in the drawing, the processor 120 may maintain the state of the first switch 910, the second switch 915, the third switch 925, and the seventh switch 950 as the first state, and maintain the state of the fourth switch 430, the fifth switch 935, and the sixth switch 945 as the second state, on the basis of identifying that the first voltage corresponds to the charging voltage of the battery 189 on the basis of the data received from the external electronic device. On the basis of the maintenance, the input terminal 905 may be connected directly to the output terminal 955. On the basis of the direct connection between the input terminal 905 and the output terminal 955, the first voltage applied from the external electronic device may be applied to the battery 189.

As mentioned above, the electronic device 101 of one or more embodiments may include the voltage divider 310 capable of charging the battery 189 through a high-speed charging performance maintaining compatibility while being improved, by adaptively supporting a 3-to-1 voltage division ratio, a 2-to-1 voltage division ratio, and a 1-to-1 voltage division ratio.

According to certain embodiments, an electronic device can comprise a rechargeable battery; a connector configured to connected the electronic device with an external electronic device; a voltage divider comprising a plurality of capacitors and a plurality of switches for switching an electrical path between each of the plurality of capacitors and the battery, wherein the voltage divider is configured to provide three or more voltage division ratios; and a processor operably coupled with the voltage divider and the connector, wherein the processor is configured to: receive an indicator indicating a first voltage of a first power from the external electronic device; select a voltage division ratio from the three or more division ratios, based at least in part on the indicator; and control the plurality of switches on the basis of the selected voltage division ratio, and wherein the voltage divider is configured to: charge a battery with a second voltage by dividing the first voltage according to the selected voltage division ratio.

According to certain embodiments, the plurality of capacitors comprise a first capacitor and a second capacitor, wherein the voltage divider comprises an input terminal electrically connected with the connector and an output terminal electrically connected with the battery, and wherein the processor is configured to: when the first voltage is substantially triple the charging voltage of the battery, control the plurality of switches to electrically connect the first capacitor and the second capacitor in series with respect to the battery between the input terminal and the output terminal, and after the first capacitor is charged to a first charging voltage and the second charging capacitor is charged to a second charging voltage, electrically disconnect the input terminal from the first capacitor, the second capacitor, and the output terminal and electrically connect the first capacitor and the second capacitor in parallel with respect to the output terminal.

According to certain embodiments, the processor is configured to, when the first voltage substantially corresponds to the charging voltage of the battery, controlling the switches to form a short circuit between the input terminal and the output terminal.

According to certain embodiments, the processor is configured to, when the first voltage is substantially double the charging voltage of the battery, control the plurality of switches to electrically connect the first capacitor in series with respect to the battery between the input terminal and the output terminal, and after the first capacitor is charged to a first charging voltage, electrically disconnect the input terminal from the first capacitor and the output terminal, and electrically connect the first capacitor in parallel with respect to the battery.

According to certain embodiments, the processor is configured to, when the first voltage is substantially double the charging voltage of the battery, control the plurality of switches to electrically connect the second capacitor in series with respect to the battery between the input terminal and the output terminal, and after the second capacitor is charged to a second charging voltage, electrically disconnect the output terminal and the second capacitor, and electrically connect the second capacitor to the output terminal in parallel with respect to the battery.

According to certain embodiments, the input terminal is further connected with an input capacitor.

According to certain embodiments, the processor is configured to initialize the first capacitor and the second capacitor is performed using a linear regulator electrically connected with the voltage divider.

According to certain embodiments, a first power received via the connector from the external electronic device is used to apply the first voltage and a first current less than a maximum current for the connector, and the voltage divider is configured to: when the first voltage is substantially triple the charging voltage of the battery, apply the second voltage and a current that is substantially triple the first current, to the battery; when the first voltage is substantially double the charging voltage of the battery, apply the second voltage and a current that is substantially double the first current, to the battery; and in response to the first voltage substantially corresponding to the charging voltage of the battery, apply the second voltage and the first current to the battery.

According to certain embodiments, the processor is configured to control each of the plurality of switches on the basis of a specified time cycle.

According to certain embodiments, a charging path switching circuitry is operably coupled with the processor, and the processor is configured to: identify whether the first voltage can be processed using the voltage divider, on the basis of the indicator; and control the charging path switching circuitry on the basis of identifying that the first voltage cannot be processed using the voltage divider, and wherein the charging path switching circuitry is configured to provide the first power received via the connector from the external electronic device, to another power management circuitry different from the voltage divider.

In an embodiment, the voltage divider may include an input terminal electrically connected with the external electronic device via the connector (e.g., the connector 178), a first switch (e.g., the first switch 410), a second switch (e.g., the second switch 415), a first capacitor (e.g., the first capacitor 420), a third switch (e.g., the third switch 425), a fourth switch (e.g., the fourth switch 430), a fifth switch (e.g., the fifth switch 435), a second capacitor (e.g., the second capacitor 440), a sixth switch (e.g., the sixth switch 445), a seventh switch (e.g., the seventh switch 450), a first node (e.g., the first node 461), a second node (e.g., the second node 462), a third node (e.g., the third node 463), a fourth node (e.g., the fourth node 464), and an output terminal (e.g., the output terminal 455) electrically connected with the battery and being a fifth node (e.g., the fifth node). The first switch may be disposed between the input terminal and the first node, and the first capacitor may be disposed between the first node and the second node, and the second switch may be disposed between the first node and the third node, and the third switch may be disposed between the second node and a first ground node (e.g., the first ground node 462-1), and the fourth switch may be disposed between the second node and the third node, and the fifth switch may be disposed between the third node and the fifth node, and the second capacitor may be disposed between the third node and the fourth node, and the sixth switch may be disposed between the fourth node and a second ground node (e.g., the second ground node 464-1), and the seventh switch may be disposed between the fourth node and the fifth node, and the battery may be disposed between the fifth node and a third ground node (e.g., the third ground node 465-1).

In an embodiment, the processor is configured to, in response to the first voltage being substantially triple (or between 2.75 and 3.25 times) the charging voltage of the battery, electrically connect the input terminal and the first capacitor by switching a state of the first switch into a first state, and electrically connect the first capacitor and the second capacitor by switching a state of the fourth switch into the first state, and electrically connect the second capacitor and the output terminal by switching a state of the seventh switch into the first state. The voltage divider may be configured to, in response to the first voltage being substantially triple (or between 2.75 and 3.25 times) the charging voltage of the battery, charge the first capacitor and the second capacitor which are connected in series with respect to the input terminal and the output terminal, on the basis of the switching of the state of the first switch, the fourth switch, and the seventh switch of the processor.

In an embodiment, the processor may be configured to, in response to the first voltage being substantially triple (or between 2.75 and 3.25 times) the charging voltage of the battery, switch the first state of the first switch, the fourth switch, and the seventh switch into a second state, and switch a state of the second switch from the second state to the first state, and switch a state of the third switch from the second state to the first state, and switch a state of the fifth switch from the second state to the first state, and switch a state of the sixth switch from the second state to the first state, wherein, after each of the first capacitor and the second capacitor gets the charging voltage by the charging of the first capacitor and the charging of the second capacitor, the input terminal is electrically disconnected with the output terminal, the first capacitor, and the second capacitor, and the first capacitor having the charging voltage and the second capacitor having the charging voltage are connected to the output terminal in parallel with respect to the battery. The voltage divider may be configured to, by presenting the second power to the battery on the basis of the discharging of the first capacitor and the second capacitor connected in parallel with respect to the battery, perform the charging of the battery.

In an embodiment, the processor may be configured to, in response to the first voltage being substantially double (or between 1.75 and 2.25 times) the charging voltage of the battery, while maintaining the state of the fifth switch and the sixth switch as the first state and maintaining the state of the seventh switch as the second state, electrically connect the input terminal and the first capacitor by switching the state of the first switch into the first state, and electrically connect the first capacitor and the output terminal by switching the state of the fourth switch into the first state. The voltage divider may be configured to, in response to the first voltage being substantially double (or between 1.75 and 2.25 times) the charging voltage of the battery, charge the first capacitor connected in series with respect to the input terminal and the output terminal, on the basis of the maintaining of the state of the fifth switch, the sixth switch, and the seventh switch of the processor and the switching of the state of the first switch and the fourth switch of the processor.

In an embodiment, the processor may be configured to, in response to the first voltage being substantially double (or between 1.75 and 2.25 times) the charging voltage of the battery, switch the first state of the first switch and the fourth switch into the second state, and switch the state of the second switch from the second state to the first state, and switch the state of the third switch from the second state to the first state, wherein, after the first capacitor gets the charging voltage by the charging of the first capacitor, the input terminal is electrically disconnected with the output terminal and the first capacitor, and the first capacitor having the charging voltage is connected to the output terminal in parallel with respect to the battery. The voltage divider may be configured to, by presenting the second power to the battery on the basis of the discharging of the first capacitor connected in parallel with respect to the battery, perform the charging of the battery.

In an embodiment, the processor may be configured to, in response to the first voltage corresponding to the charging voltage of the battery, electrically connect the input terminal and the output terminal by maintaining the state of the first switch, the second switch, the third switch, the fifth switch, and the sixth switch as the first state. The voltage divider may be configured to, by presenting the first power to the battery on the basis of applying the first voltage to the output terminal, perform the charging of the battery.

In an embodiment, the processor may be configured to, in response to the first voltage being substantially double (or between 1.75 and 2.25 times) the charging voltage of the battery, while maintaining the state of the first switch and the third switch as the first state and maintaining the state of the fourth switch as the second state, electrically connect the input terminal and the second capacitor by switching the state of the second switch into the first state, and electrically connect the second capacitor and the output terminal by switching a state of the seventh switch into the first state. The voltage divider may be configured to, in response to the first voltage being substantially double (or between 1.75 and 2.25 times) the charging voltage of the battery, charge the second capacitor connected in series with respect to the input terminal and the output terminal, on the basis of the maintaining of the state of the first switch, the third switch, and the fourth switch of the processor and the switching of the state of the second switch and the seventh switch of the processor.

In an embodiment, the processor may be configured to, in response to the first voltage being substantially double (or between 1.75 and 2.25 times) the charging voltage of the battery, switch the first state of the second switch and the seventh switch into the second state, and switch the state of the fifth switch from the second state to the first state, and switch the state of the sixth switch from the second state to the first state, wherein, after the second capacitor gets the charging voltage by the charging of the second capacitor, the input terminal is electrically disconnected with the output terminal and the second capacitor, and the second capacitor having the charging voltage is connected to the output terminal in parallel with respect to the battery. The voltage divider may be configured to perform the charging of the battery by presenting the second power to the battery on the basis of the discharging of the second capacitor connected in parallel with respect to the battery.

In an embodiment, each of the first switch to the seventh switch may include a metal oxide semiconductor field effect transistor (MOSFET).

In an embodiment, the voltage divider may include an input terminal (e.g., the input terminal 905) electrically connected with the external electronic device via the connector, a first switch (e.g., the first switch 910), a second switch (e.g., the second switch 915), a first capacitor (e.g., the first capacitor 920), a third switch (e.g., the third switch 925), a fourth switch (e.g., the fourth switch 930), a fifth switch (e.g., the fifth switch 935), a second capacitor (e.g., the second capacitor 940), a sixth switch (e.g., the sixth switch 945), a seventh switch (e.g., the seventh switch 950), a first node (e.g., the first node 961), a second node (e.g., the second node 962), a third node (e.g., the third node 963), a fourth node (e.g., the fourth node 964), and an output terminal (e.g., the output terminal 955) electrically connected with the battery and being a fifth node (e.g., the fifth node 965). The first switch may be disposed between the input terminal and the first node, and the second switch may be disposed between the first node and the fifth node, and the first capacitor may be disposed between the first node and the second node, and the third switch may be disposed between the second node and a first ground node (e.g., the first ground node 962-1), and the fourth switch may be disposed between the second node and the third node, and the fifth switch may be disposed between the third node and the fifth node, and the second capacitor may be disposed between the third node and the fourth node, and the sixth switch may be disposed between the fourth node and the fifth node, and the seventh switch may be disposed between the fourth node and a second ground node (e.g., the second ground node 964-1), and the battery may be disposed between the fifth node and a third ground node (e.g., the third ground node 965-1).

Figure 12:
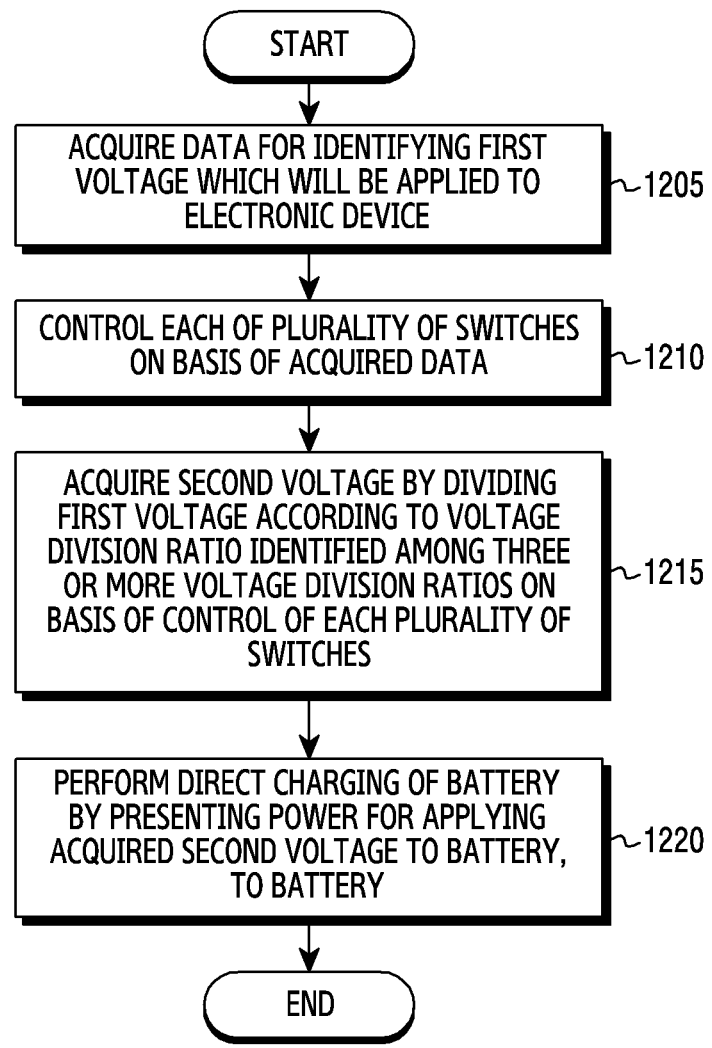
FIG. 12 is a flowchart illustrating an operation of performing direct charging by adaptively performing voltage division through a voltage divider according to one or more embodiments.

FIG. 12 is a flowchart illustrating an operation of performing direct charging by adaptively performing voltage division through a voltage divider according to one or more embodiments. This operation may be performed by the processor 120 shown in FIG. 1 or FIG. 3 and the voltage divider 310.

Referring to FIG. 12, in operation 1205, for the sake of direct charging of the battery 189 via the connector 178 from an external electronic device (e.g., a travel adapter (TA) or power adapter (PA)), the processor 120 may acquire data related to a first voltage which will be applied to the electronic device 101, from the external electronic device. For example, in response to the type of the connector 178 being a USB c-type, the data may be acquired on the basis of the USB PD communication protocol.

In operation 1210, on the basis of the acquired data, the processor 120 may control each of a plurality of switches (e.g., the first switch 410 to the seventh switch 450 of FIG. 4, or the first switch 910 to the seventh switch 950 of FIG. 9) included in the voltage divider 310. For example, the processor 120 may control the each of the plurality of switches, in order to acquire a second voltage corresponding to the charging voltage by dividing the first voltage by a voltage division ratio corresponding to the data among three or more voltage division ratios supportable using the voltage divider 310.

In operation 1215, by dividing the first voltage according to the voltage division ratio identified among the three or more voltage division ratios on the basis of the control of the each of the plurality of switches of the processor 120, the voltage divider 310 may acquire the second voltage corresponding to the charging voltage of the battery. For example, by connecting the plurality of capacitors (e.g., the first capacitor 420 and the second capacitor 440 of FIG. 4, or the first capacitor 920 and the second capacitor 940 of FIG. 9) included in the voltage divider 310 in series with each of the input terminal and the output terminal of the voltage divider 310 on the basis of the control of the each of the plurality of switches of the processor 120, the voltage divider 310 may charge the each of the plurality of capacitors. After the each of the plurality of capacitors gets the charging voltage of the battery 189 by the charging, the voltage divider 310 may connect the plurality of capacitors having the charging voltage of the battery 189 by the charging, in parallel with respect to the battery 189, on the basis of the control of the each of the plurality of switches of the processor 120. On the basis of the discharging of the each of the plurality of capacitors, the voltage divider 310 may acquire the second voltage corresponding to the charging voltage of the battery 189. On the other hand, on the basis of the discharging of the each of the plurality of capacitors, the voltage divider 310 may acquire a current having a magnitude greater than a maximum acceptable current magnitude of the connector 178.

In operation 1220, by presenting power for applying the acquired second voltage to the battery 189, to the battery 189, the voltage divider 310 may perform the direct charging of the battery 189. For example, by applying the second voltage and a current having a magnitude greater than a maximum acceptable current magnitude of the connector 178 to the battery 189, the voltage divider 310 may perform the direct charging.

As mentioned above, the electronic device 101 of one or more embodiments may efficiently charge the battery 189 in interlocking with various types of external electronic devices, by acquiring the second voltage by dividing the first voltage applied from the external electronic device through the voltage divider supporting a plurality of voltage division ratios, and acquiring a current amplified as much as an inverse number of a ratio between the first voltage and the second voltage.

Methods of embodiments mentioned in the claims or specification of the present disclosure may be implemented in the form of hardware, or hardware programmed with software.

In certain embodiments, a computer-readable storage media storing one or more programs (i.e., software modules) may be provided. The one or more programs stored in the computer-readable storage media are configured to be executable by one or more processors of an electronic device. The one or more programs include instructions for enabling the electronic device to execute the methods of the embodiments stated in the claims or specification of the present disclosure.

These programs (i.e., software modules and/or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the program may be stored in a memory that is configured in combination of some of them or all. Also, each configured memory may be included in plural as well.

Also, the program may be stored in an attachable storage device that may access through a communication network such as the Internet, an intranet, a local area network (LAN), a wireless LAN (WLAN) or a storage area network (SAN), or a communication network configured in combination of them. This storage device may access a device performing an embodiment of the present disclosure through an external port. Also, a separate storage device on the communication network may access the device performing the embodiment of the present disclosure as well.

In the aforementioned concrete embodiments of the present disclosure, constituent elements included in the disclosure have been expressed in the singular or plural according to a proposed concrete embodiment. But, the expression of the singular form or plural form is selected suitable to a given situation for description convenience's sake, and the present disclosure is not limited to singular or plural components. Even a component expressed in the plural form may be constructed in the singular form, or even a component expressed in the singular form may be constructed in the plural form.

While a detailed description of the present disclosure has been made for a concrete embodiment, it is undoubted that various modifications are available without departing from the scope of the present disclosure. Therefore, the scope of the present disclosure should not be limited to and defined by the described embodiment and should be defined by not only claims mentioned below but also equivalents to these claims.

What is claimed is:

1. An electronic device comprising:
   a rechargeable battery;
   a connector configured to connect the electronic device with an external electronic device;
   a voltage divider comprising:
   a plurality of capacitors, wherein the plurality of capacitors comprise a first capacitor and a second capacitor,
   a plurality of switches for switching an electrical path between each of the plurality of capacitors and the rechargeable battery,
   an input terminal electrically connected with the connector and an output terminal electrically connected with the rechargeable battery,
   wherein the voltage divider is configured to provide three or more voltage division ratios; and
   a processor operably coupled with the voltage divider and the connector,
   wherein the processor is configured to:
   receive data indicating a first voltage of a first power from the external electronic device;
   select a voltage division ratio from the three or more voltage division ratios, based at least in part on the data; and
   control the plurality of switches based on the selected voltage division ratio, comprising:
   when the first voltage is substantially triple a charging voltage of the rechargeable battery, control the plurality of switches to electrically connect the first capacitor and the second capacitor in series with respect to the rechargeable battery between the input terminal and the output terminal, and after the first capacitor is charged to a first charging voltage and the second capacitor is charged to a second charging voltage, electrically disconnect the input terminal from the first capacitor, the second capacitor, and the output terminal and electrically connect the first capacitor and the second capacitor in parallel with respect to the output terminal,
   wherein the voltage divider is configured to:
   charge the rechargeable battery with a second voltage by dividing the first voltage according to the selected voltage division ratio.

2. The electronic device of claim 1, wherein the processor is configured to:
   when the first voltage substantially corresponds to the charging voltage of the rechargeable battery, controlling the plurality of switches to form a short circuit between the input terminal and the output terminal.

3. The electronic device of claim 2, wherein the processor is configured to:
when the first voltage is substantially double the charging voltage of the rechargeable battery, control the plurality of switches to electrically connect the first capacitor-in series with respect to the rechargeable battery between the input terminal and the output terminal, and after the first capacitor is charged to the first charging voltage, electrically disconnect the input terminal from the first capacitor and the output terminal, and electrically connect the first capacitor in parallel with respect to the rechargeable battery.

4. The electronic device of claim 3, wherein the processor is configured to:
when the first voltage is substantially double the charging voltage of the rechargeable battery, control the plurality of switches to electrically connect the second capacitor in series with respect to the rechargeable battery between the input terminal and the output terminal, and after the second capacitor is charged to the second charging voltage, electrically disconnect the output terminal and the second capacitor, and electrically connect the second capacitor to the output terminal in parallel with respect to the rechargeable battery.

5. The electronic device of claim 4, wherein the first power received via the connector from the external electronic device is used to apply the first voltage and a first current less than a maximum current for the connector, and
wherein the voltage divider is configured to:
when the first voltage is substantially triple theft charging voltage of the rechargeable battery, apply the second voltage and a current that is substantially triple the first current, to the rechargeable battery;
when the first voltage is substantially double the charging voltage of the rechargeable battery, apply the second voltage and a current that is substantially double the first current, to the rechargeable battery; and
when the first voltage substantially corresponds to the charging voltage of the rechargeable battery, apply the second voltage and the first current to the rechargeable battery.

6. The electronic device of claim 1, wherein the input terminal is further connected with an input capacitor.

7. The electronic device of claim 1, wherein the processor is configured to initialize the first capacitor and the second capacitor using a linear regulator electrically connected with the voltage divider.

8. The electronic device of claim 1, wherein the processor is configured to control each of the plurality of switches based on a specified time cycle.

9. The electronic device of claim 1, further comprising a charging path switching circuitry operably coupled with the processor,
wherein the processor is configured to:
identify whether the first voltage can be processed using the voltage divider, based on the data; and
control the charging path switching circuitry on the basis of identifying that the first voltage cannot be processed using the voltage divider, and
wherein the charging path switching circuitry is configured to provide the first power received via the connector from the external electronic device, to another power management circuitry different from the voltage divider.

10. The electronic device of claim 1, wherein the input terminal is electrically connected with the external electronic device via the connector, and wherein the voltage divider further comprises:
a first switch;
a second switch;
a third switch;
a fourth switch;
a fifth switch;
a sixth switch;
a seventh switch;
a first node;
a second node;
a third node; and
a fourth node; and
wherein the output terminal is a fifth node, and
wherein the first switch is disposed between the input terminal and the first node, and the first capacitor is disposed between the first node and the second node, and the second switch is disposed between the first node and the third node, and the third switch is disposed between the second node and a first ground node, and the fourth switch is disposed between the second node and the third node, and the fifth switch is disposed between the third node and the fifth node, and the second capacitor is disposed between the third node and the fourth node, and the sixth switch is disposed between the fourth node and a second ground node, and the seventh switch is disposed between the fourth node and the fifth node, and the rechargeable battery is disposed between the fifth node and a third ground node.

11. The electronic device of claim 10, wherein the processor is configured to:
when the first voltage is substantially triple the charging voltage of the rechargeable battery, electrically connect the input terminal and the first capacitor by switching a state of the first switch into a first state;
electrically connect the first capacitor and the second capacitor by switching a state of the fourth switch into the first state; and
electrically connect the second capacitor and the output terminal by switching a state of the seventh switch into the first state.

12. The electronic device of claim 11, wherein the processor is configured to:
when the first voltage is substantially triple the charging voltage of the rechargeable battery, and
switch the first state of the first switch, the fourth switch, and the seventh switch into a second state, and switch a state of the second switch from the second state to the first state, and switch a state of the third switch from the second state to the first state, and switch a state of the fifth switch from the second state to the first state, and switch a state of the sixth switch from the second state to the first state, wherein, after the first capacitor is charged to the first charging voltage and the second capacitor is charged to the second charging voltage, the input terminal is electrically disconnected with the output terminal, the first capacitor, and the second capacitor, and the first capacitor and the second capacitor are connected to the output terminal in parallel with respect to the rechargeable battery.

13. The electronic device of claim 10, wherein the processor is configured to:
when the first voltage is substantially double a charging voltage of the rechargeable battery, and while maintaining a state of the fifth switch and the sixth switch as a first state and maintaining a state of the seventh switch as a second state, electrically connect the input terminal and the first capacitor by switching the state of the first switch into the first state, and electrically connect the first capacitor and the output terminal by switching the state of the fourth switch into the first state.

14. The electronic device of claim 13, wherein the processor is configured to:
when the first voltage is substantially double the charging voltage of the rechargeable battery, and
switch the first state of the first switch and the fourth switch into the second state, and switch the state of the second switch from the second state to the first state, and switch the state of the third switch from the second state to the first state, wherein, after the first capacitor is charged to a first charging value, the input terminal is electrically disconnected with the output terminal and the first capacitor, and the first capacitor is connected to the output terminal in parallel with respect to the rechargeable battery.

15. The electronic device of claim 10, wherein the processor is configured to:
in response to the first voltage corresponding to a charging voltage of the rechargeable battery, electrically connect the input terminal and the output terminal by maintaining a state of the first switch, the second switch, the third switch, the fifth switch, and the sixth switch as a first state.

16. The electronic device of claim 10, wherein the processor is configured to:
when the first voltage is substantially double a charging voltage of the rechargeable battery, and
while maintaining a state of the first switch and the third switch as a first state and maintaining a state of the fourth switch as a second state, electrically connect the input terminal and the second capacitor by switching the state of the second switch into the first state, and electrically connect the second capacitor and the output terminal by switching a state of the seventh switch into the first state.

17. The electronic device of claim 16, wherein the processor is configured to:
when the first voltage is substantially double the charging voltage of the rechargeable battery, and
switch the first state of the second switch and the seventh switch into the second state, and switch the state of the fifth switch from the second state to the first state, and switch the state of the sixth switch from the second state to the first state, wherein, after the second capacitor gets the charging voltage by charging of the second capacitor, the input terminal is electrically disconnected with the output terminal and the second capacitor, and the second capacitor having the charging voltage is connected to the output terminal in parallel with respect to the rechargeable battery.

18. The electronic device of claim 10, wherein each of the first switch to the seventh switch comprises a metal oxide semiconductor field effect transistor (MOSFET).

19. The electronic device of claim 1, wherein the input terminal is electrically connected with the external electronic device via the connector, and wherein the voltage divider further comprises:
a first switch;
a second switch;
a third switch;
a fourth switch;
a fifth switch;
a sixth switch;
a seventh switch;
a first node;
a second node;
a third node; and
a fourth node; and
wherein the output terminal is a fifth node, and
wherein the first switch is disposed between the input terminal and the first node, and the second switch is disposed between the first node and the fifth node, and the first capacitor is disposed between the first node and the second node, and the third switch is disposed between the second node and a first ground node, and the fourth switch is disposed between the second node and the third node, and the fifth switch is disposed between the third node and the fifth node, and the second capacitor is disposed between the third node and the fourth node, and the sixth switch is disposed between the fourth node and the fifth node, and the seventh switch is disposed between the fourth node and a second ground node, and the rechargeable battery is disposed between the fifth node and a third ground node.

* * * * *